(12) United States Patent
Ahmed et al.

(10) Patent No.: US 9,524,052 B2
(45) Date of Patent: Dec. 20, 2016

(54) EFFICIENT LOSSLESS COMPRESSION FOR PERIPHERAL INTERFACE DATA TRANSFER

(71) Applicant: QUALCOMM Incorporated, San Diego, CA (US)

(72) Inventors: Mohamed Imtiaz Ahmed, San Marcos, CA (US); Chia-Yuan Teng, San Diego, CA (US); Jun Han, San Diego, CA (US); Raghukul Tilak, San Diego, CA (US); Suhail Jalil, Poway, CA (US); Junchen Du, San Diego, CA (US); Fariborz Pourbigharaz, San Diego, CA (US); Bo Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 14/608,750

(22) Filed: Jan. 29, 2015

(65) Prior Publication Data

US 2015/0309650 A1    Oct. 29, 2015

Related U.S. Application Data

(60) Provisional application No. 61/984,023, filed on Apr. 24, 2014.

(51) Int. Cl.
| | | |
|---|---|---|
| *G06F 3/041* | (2006.01) | |
| *G06T 1/60* | (2006.01) | |
| *G06T 9/00* | (2006.01) | |

(52) U.S. Cl.
CPC ............... *G06F 3/0416* (2013.01); *G06T 1/60* (2013.01); *G06T 9/00* (2013.01); *G06T 9/004* (2013.01)

(58) Field of Classification Search
CPC .......... G06F 3/0416; G06F 3/041; G06T 1/60; G06T 9/004; H04N 19/503
See application file for complete search history.

(56) References Cited

U.S. PATENT DOCUMENTS

| 5,574,503 A | 11/1996 | May |
| 6,011,873 A | 1/2000 | Desai et al. |

(Continued)

FOREIGN PATENT DOCUMENTS

| WO | WO-0115443 A1 | 3/2001 |
| WO | WO-2013089700 A1 | 6/2013 |

OTHER PUBLICATIONS

International Search Report and Written Opinion—PCT/US2015/022422—ISA/EPO—Jun. 12, 2015.

*Primary Examiner* — Towfiq Elahi
(74) *Attorney, Agent, or Firm* — Loza & Loza, LLP

(57) ABSTRACT

A method, an apparatus, and a computer program product for processing touchscreen information are provided. The method may include receiving touchscreen data that includes node values representative of signals generated by a touchscreen panel, generating a first data frame including difference values, and transmitting the first data frame over a control data bus. Each of the difference values may be calculated as a difference between one of the node values and a different node-related value wherein the first data frame has a predefined size. The first data frame may be configured to permit a receiver of the first data frame to reconstruct the touchscreen data without information loss.

27 Claims, 24 Drawing Sheets

(56) References Cited

U.S. PATENT DOCUMENTS

| | | | |
|---|---|---|---|
| 6,549,675 B2 | 4/2003 | Chatterjee | |
| 8,731,374 B2 * | 5/2014 | Mullins | G11B 27/034 386/284 |
| 2010/0097328 A1 * | 4/2010 | Simmons | G06F 3/0416 345/173 |
| 2010/0315352 A1 * | 12/2010 | Hamamura | G06F 3/0486 345/173 |
| 2012/0081301 A1 * | 4/2012 | Lin | G06F 3/0416 345/173 |
| 2013/0141375 A1 | 6/2013 | Ludwig et al. | |
| 2014/0064384 A1 | 3/2014 | Wang | |
| 2015/0242047 A1 * | 8/2015 | Zafiris | G06F 3/0418 345/178 |

* cited by examiner

EFFICIENT LOSSLESS COMPRESSION FOR PERIPHERAL INTERFACE DATA TRANSFER

CROSS-REFERENCE TO RELATED APPLICATIONS

This application claims priority to and the benefit of provisional patent application No. 61/984,023, which was filed in the United State Patent Office on Apr. 24, 2014, the entire content of which is incorporated herein by reference.

TECHNICAL FIELD

The present disclosure relates generally to systems and methods for handling touchscreen displays, and more particularly, to systems and methods that enable lossless compression of touchscreen data.

BACKGROUND

Modern computing devices, including mobile smart phones, tablets, media players, appliances, wearable computing devices, and the like may have user interfaces that employ a touchscreen to gather and process user touchscreen data. Touch-sensitive devices may contain hundreds of touch sensors, or nodes that are managed by a touchscreen controller. The touchscreen controller processes detected touch input, and executes related commands based on the input. Touchscreen information may be transmitted from a touchscreen controller to a general-purpose processor for further processing.

Touchscreen information is typically both time-sensitive and error-sensitive. For example, user input may include small changes in position of a finger, pen and/or stylus, and sub-second responses to such change are often expected or required to avoid poor user experience. However, legacy systems may lack the bandwidth between internal devices to operate efficiently in modern devices.

Therefore, there is a need for improved processing of touchscreen data, particularly in devices that communicate over wireless communications systems.

SUMMARY

Certain aspects disclosed herein relate to data compression techniques that may be used to optimize bandwidth of communications links used to communicate touch data.

In certain aspects of the disclosure, a method, a computer program product, and an apparatus are provided. The method may include receiving touchscreen data that includes node values representative of signals generated by a touchscreen panel, calculating difference values for the node values, each difference value representing a difference between one of the node values and a different node-related value, determining a bit size for words to be used for storing the difference values, generating a first data frame including the difference values, and transmitting the first data frame over a control data bus. The first data frame may have a predefined size. A receiver of the first data frame may be adapted to reconstruct the touchscreen data without information loss using a plurality of node values provided in one or more previously transmitted frames. The one or more previously transmitted frames may include at least one uncompressed frame.

In one aspect, the method includes organizing the node values as a plurality of rows corresponding to physical rows of sensors on the touchscreen panel, and independently calculating a set of difference values for each row. Calculating a set of difference values for each row may include designating a first node in the each row as a reference node, determining a first difference value as a mathematical difference between the reference node and a second first node in the each row, the first node and the second node corresponding to physically adjacent sensors on the touchscreen panel, and determining a second difference value as a mathematical difference between the second node and a third node in the each row, the second node and the third node corresponding to physically adjacent sensors on the touchscreen panel.

In one aspect, the method includes organizing the node values as a plurality of columns corresponding to physical columns of sensors on the touchscreen panel, independently calculating a set of difference values for each column, designating a first node in the each column as a reference node, determining a first difference value as a mathematical difference between the reference node and a second first node in the each column, the first node and the second node corresponding to physically adjacent sensors on the touchscreen panel, and determining a second difference value as a mathematical difference between the second node and a third node in the each column, the second node and the third node corresponding to physically adjacent sensors on the touchscreen panel. The different node-related value may correspond to at least one sensor on the touchscreen panel that is physically adjacent to a sensor corresponding to the one node.

In one aspect, the method includes organizing the node values in a plurality of blocks corresponding to blocks of physically proximate sensors on the touchscreen panel, and calculating a set of difference values for each of the plurality of blocks. A different node-related value may be defined for each of the plurality of blocks.

In one aspect, the method includes determining a maximum difference value in a plurality of the difference values, calculating a number of bits needed to encode the maximum difference value, and generating a payload by encoding each difference value using the number of bits needed to encode the maximum difference value. The method may also include packing a plurality of data elements in the payload, and adding a header to the payload to obtain the first data frame. The header may identify a number of bits needed to encode the maximum difference value. The method may include providing at least a portion of the payload in a second data frame that carries a different payload. The first data frame and the second data frame may be equal in size.

In one aspect, the method includes generating a predicted value for a first node, and generating one of the difference values based on a difference calculated between the predicted value for the first node and one of the node values in the touchscreen data that corresponds to the first node. Generating the predicted value for the first node may include using a spatial predictive algorithm. Generating the predicted value for the first node may include using a temporal predictive algorithm.

In various aspects, an apparatus may include a touchscreen interface that includes a communications interface adapted to communicate data over a serial bus, and a touchscreen controller. The touchscreen controller may be configured to receive touchscreen data that includes node values representative of signals generated by a touchscreen panel, calculate difference values for the node values, each difference value representing a difference between one of the node values and a different node-related value, determine a bit size for words to be used for storing the difference values, generate a first data frame that includes the difference values, and transmit the first data frame over a control data bus. The first data frame may have a predefined size. A receiver of the first data frame may be adapted to reconstruct the touchscreen data without information loss using a plurality of node values provided in one or more previously transmitted frames. The one or more previously transmitted frames may include at least one uncompressed frame.

In various aspects, a processor readable storage medium stores instructions and data. The storage medium may include transitory and non-transitory storage. The instructions may be executable by one or more processing devices and/or circuits. Certain instructions, when executed by a processor, may cause the processor to receive touchscreen data that includes node values representative of signals generated by a touchscreen panel, calculate difference values for the node values, each difference value representing a difference between one of the node values and a different node-related value, determine a bit size for words to be used for storing the difference values, generate a first data frame that includes the difference values, and transmit the first data frame over a control data bus. The first data frame may have a predefined size. A receiver of the first data frame may be adapted to reconstruct the touchscreen data without information loss using a plurality of node values provided in one or more previously transmitted frames. The one or more previously transmitted frames may include at least one uncompressed frame.

In various aspects, an apparatus may include a touchscreen interface that includes a communications interface adapted to communicate data over a serial bus, a touchscreen controller, means for receiving touchscreen data that includes node values representative of signals generated by a touchscreen panel, means for calculating difference values for the node values, each difference value representing a difference between one of the node values and a different node-related value, means for determining a bit size for words to be used for storing the difference values, means for generating a first data frame that includes the difference values, and means for transmitting the first data frame over a control data bus. The first data frame may have a predefined size. A receiver of the first data frame may be adapted to reconstruct the touchscreen data without information loss using a plurality of node values provided in one or more previously transmitted frames. The one or more previously transmitted frames may include at least one uncompressed frame.

In certain aspects of the disclosure, a method performed at a receiver includes receiving a plurality of frames from a serial bus, the plurality of frames including at least one compressed frame, and decompressing the at least one compressed frame to obtain node values representative of signals generated by a touchscreen panel. The node values may be lossless copies of corresponding node values compressed by a transmitter of the plurality of frames. The compressed frame may have a predefined size.

In one aspect, the at least one compressed frame includes difference values. In one example, each of the difference values may represent a difference between one of the node values and a corresponding node value in a previously received frame. In another example, the at least one compressed frame may include difference values that represent a difference between one of the node values and one or more other values in the at least one compressed frame.

In one aspect, the at least one compressed frame includes difference values and the at least one compressed frame may be decompressed by generating a predicted value for a first node using a predetermined prediction algorithm, and adjusting the predicted value by a first difference value provided in the at least one compressed frame. The first difference value may correspond to the first node. Difference values in the at least one compressed frame may be calculated by the transmitter of the plurality of frames using a prediction algorithm the predetermined prediction algorithm.

In one aspect, the plurality of frames includes one or more uncompressed frames, and the method includes determining whether each frame in the plurality of frames is compressed based on a header of the each frame.

In one aspect, each node value corresponds to a state of a sensor on the touchscreen panel.

In one aspect, for each frame in the plurality of frames, the method includes unpacking a plurality of data elements received in the each frame to obtain sets of data elements corresponding to rows or columns of the touchscreen panel.

In various aspects, a processor readable storage medium stores instructions and data. The storage medium may include transitory and non-transitory storage. The instructions may be executable by one or more processing devices and/or circuits. Certain instructions, when executed by a processor, may cause the processor to receive a plurality of frames from a serial bus, the plurality of frames including at least one compressed frame, and decompress the at least one compressed frame to obtain node values representative of signals generated by a touchscreen panel. The node values may be lossless copies of corresponding node values compressed by a transmitter of the plurality of frames. The compressed frame may have a predefined size.

In certain aspects of the disclosure, an apparatus includes means for receiving a plurality of frames from a serial bus, the plurality of frames including at least one compressed frame, and means for decompressing the at least one compressed frame to obtain node values representative of signals generated by a touchscreen panel. The node values may be lossless copies of corresponding node values compressed by a transmitter of the plurality of frames. The compressed frame may have a predefined size.

BRIEF DESCRIPTION OF THE DRAWINGS

FIG. 7 illustrates an example of a raw touchscreen data frame.

FIG. 11 illustrates an example of a frame that has been compressed on a row-by-row basis in accordance with certain aspects disclosed herein.

DETAILED DESCRIPTION

Figure 1:
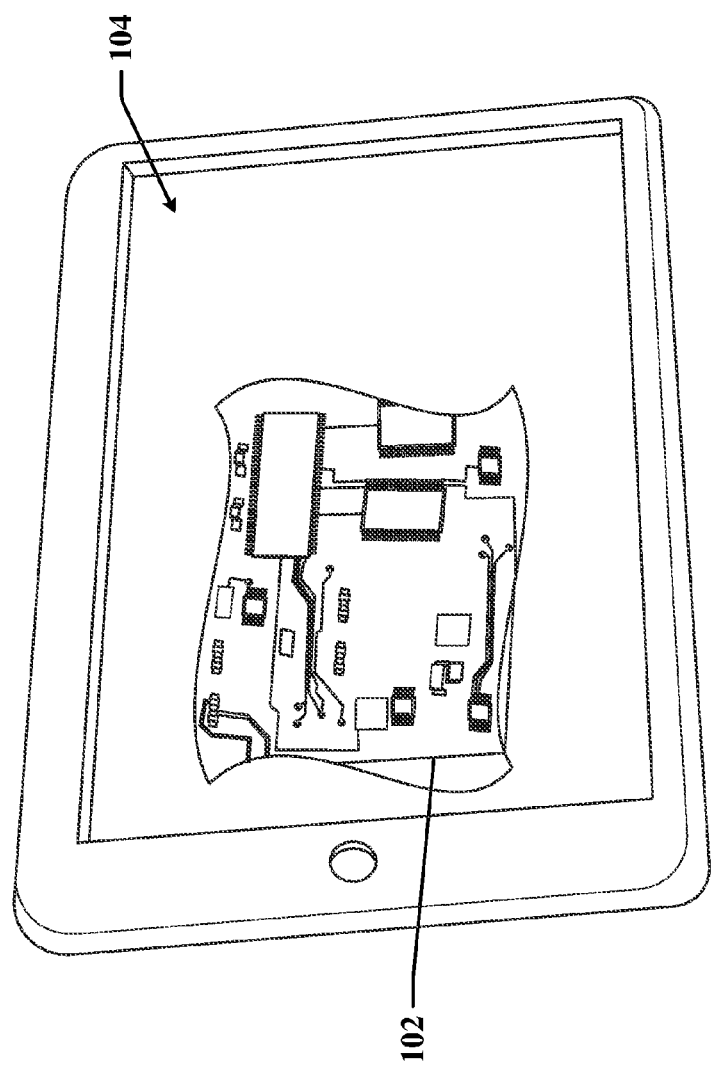
FIG. 1 is a block diagram illustrating one example of a touchscreen device that may be adapted according to certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of communications systems and processing circuits will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

With reference to FIG. 1, touchscreen displays 104 have become one of the most common forms of user interfaces for computing devices 100, especially for mobile computing devices, including devices such as cellular phones, smart phones, laptops, personal digital assistants, satellite radios, global positioning systems, multimedia devices including media players and digital audio players, video devices, cameras, game consoles, tablets, appliances, wearable computing devices, and/or other similarly functioning devices. Touchscreen displays 104 may be configured and/or operated to detect touches applied to all or part of a display area, including touches by a fingertip or a special pointer tip. A touchscreen display 104 may generate signals to be processed such that the location of the touch on the display can be recognized, movement of the fingertip or pointer can be detected, and/or to user gestures and meanings of user gestures may be discerned. Signals generated by the touchscreen display 104 may be processed by a touchscreen controller, that may be provided on a circuit board 102, flexible circuit, integrated circuit, or the like.

In some examples, touch location information may be processed by user interface software provided in a mobile computing device. For ease of reference, user touches on a touchscreen display may be referred to herein as "touch inputs," the signals generated by a touchscreen display 104 in response to a user's touch are referred to herein as "touchscreen signals," and the information carried in touchscreen signals may be referred to herein as "touchscreen data." Touchscreen data may include raw data generated by touchscreen circuits and representative of the state of the touchscreen and/or touches.

Figure 2:
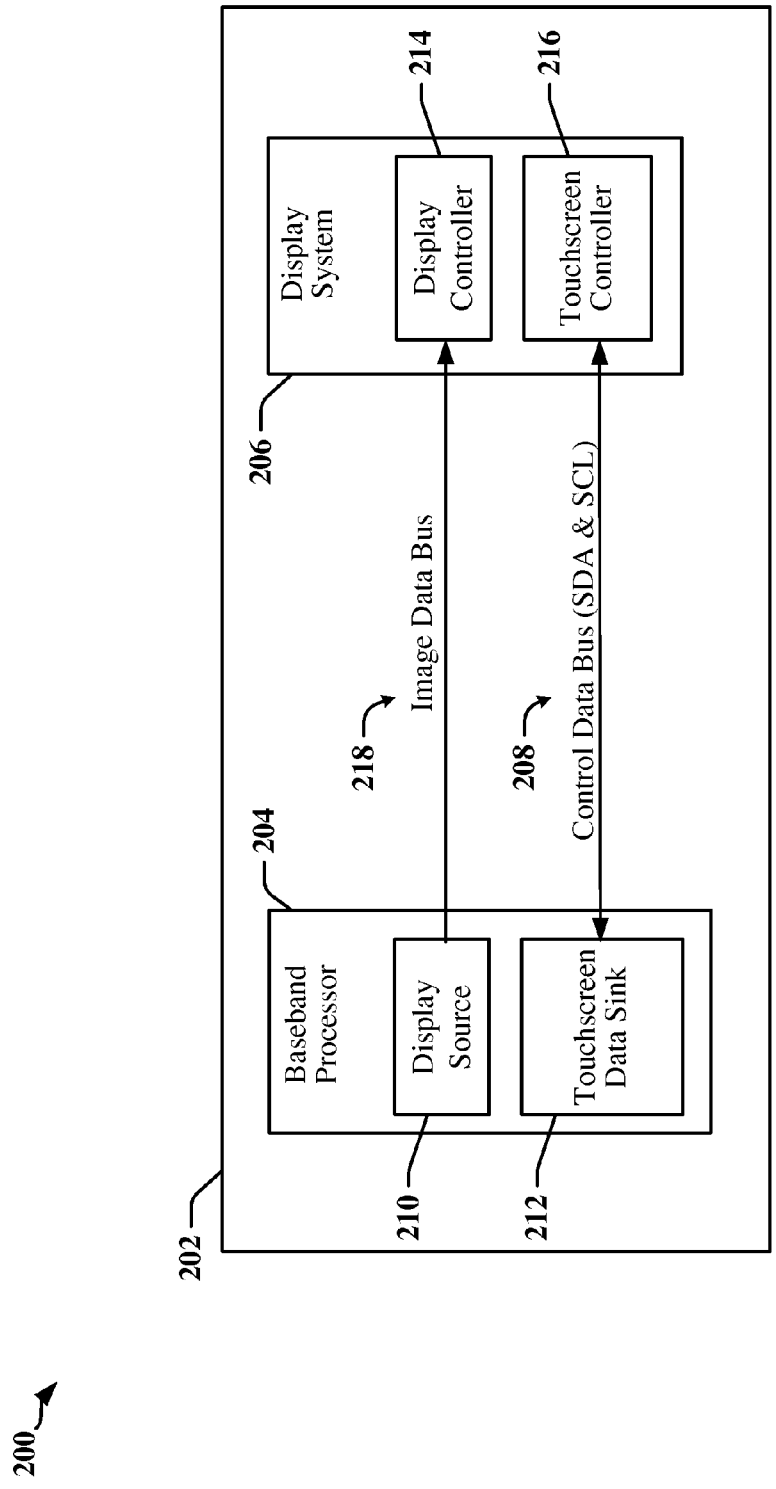
FIG. 2 is a simplified block diagram illustrating a device that has a baseband processor and a touchscreen display system and that implements an image data bus and a control data bus.

FIG. 2 is a simplified block schematic drawing illustrating a touchscreen-equipped computing device 200 that may be adapted according to certain aspects disclosed herein. The computing device 200 may include a host or baseband processor 204, a display system 206 and a communications interface connecting the baseband processor 204 and display system 206. The communications interface may include an image data bus 218 and a multi-mode control data bus 208. Image data may be sent from an image buffer or source 210 in the baseband processor 204 to a display controller 214 associated with the display system 206 over the image data bus 218. In one example, the control data bus 208 may include a serial bus that has two wires provided between the touchscreen controller 216 and a touchscreen data sink and/or processing device 212 in the baseband processor 204.

In one example, the control data bus 208 may be operated according to Inter-Integrated Circuit (I2C) protocols. I2C is a multi-master serial single-ended bus that may be used for attaching peripherals to a motherboard, embedded system, cellphone, or other electronic devices. The I2C bus includes a clock (SCL) signal line and a data (SDA) signal line with 7-bit addressing. Devices operated on an I2C bus may operate as a master device or a slave device. A master device is a device that generates the clock and initiates communication with slave devices. A slave device is a device that receives the clock and responds when addressed by the master. The I2C bus is a multi-master bus, which means that any number of master devices can be present. Additionally, master and slave roles may be changed between messages, after termination of a transmission indicated by a master device sending a STOP condition. I2C defines basic types of messages, each of which begins with a START condition and ends with a STOP condition.

The SCL may carry a clock signal that can be used to synchronize data transfers over the control data bus 208 according to I2C protocols. The SDA and SCL may be coupled to multiple devices 212 and 216. According to I2C protocols, clock speeds on the SCL wire may be up to 100 KHz for normal I2C operation, up to 400 KHz for I2C fast mode, and up to 1 MHz for I2C fast mode plus (Fm+).

The control data bus may enable a touchscreen-equipped computing device 200 to process touchscreen data received from a touchscreen display 104 in response to a user's touch. The computing device 200 may selectively employ a special-purpose touchscreen controller (TSC) 216, and/or an adapted host processor such as the baseband processor 204 in a wireless communications device. The communications interface may be deployed between the touchscreen controller 216 and the baseband processor 204 to enable the exchange of touchscreen data and/or control messages. The touchscreen controller 216 and the host processor 204 may configure the communications interface using procedures such as role negotiation procedures.

In one example of a touchscreen implementation, the image data bus 218 may be used to transfer unidirectional touchscreen data from a display source 210 to a display controller 214, while control data may be exchanged between the baseband processor 204 and the touchscreen controller 216 using a bidirectional control data bus 208.

The bandwidth of the communications interface may become a limiting factor in responsiveness of a touchscreen system and/or the resolution represented by the data produced by the touchscreen interface. In one example, bandwidth of the communications interface may become a limiting factor when the size of the touchable area increases and/or resolution of the touchscreen increases. In another example, bandwidth of the communications interface may be limited when the interface is a multipurpose interface used by other devices in a mobile computing device.

Certain aspects disclosed herein provide systems and methods for ensuring reliable, on-time delivery of touchscreen data using a control data bus 208 with limited bandwidth. In one example, a touchscreen controller 216 may be adapted to employ touchscreen data compression (TDC) in order to provide lossless data compression of touchscreen data to be transmitted over a communications interface. The touchscreen controller 216 may deliver touchscreen data in real-time without latency such that the baseband processor may respond quickly to touchscreen data representative of changing touch inputs from a user including finger taps, swipes, stylus interactions, and multi-touch pinches. The touchscreen controller 216 may operate deterministically such that touchscreen data can be delivered in compliance with a desired or specified touchscreen frame rate.

Certain TDC techniques disclosed herein can overcome limitations associated with variable length encoding techniques, which are used in some conventional I2C interfaces. In one example of variable length encoding, a slave device informs a master device of the size of a payload to be read by the master device. The master device may read a payload size register, configure the number of bytes to be read and then issue a read command to the slave device. Reading the payload size register may introduce latency of at least one I2C frame for each payload transfer. Slow turnaround times may induce additional latencies, which may be dependent on concurrency loads of the master device, for example.

According to certain aspects disclosed herein, latency issues can be overcome by fixing the size of a buffer read by a master device and providing compressed touchscreen data, such that the master device need not be informed of the payload size before each read operation. In one example, the buffer size may be fixed at a value corresponding to maximum uncompressed payload size. The maximum payload size for a touchscreen 104 that produces a 30×16 node frame, with each node represented by 12 bits, can be calculated as (30×16×12)/8=720 bytes. The buffer may be provided with additional bytes to store protocol or other information. For example, a 16-bit header may be stored in the buffer with the payload data for transmission during a payload read operation. An average latency hit of less than 1 frame per transmission may be achieved when the master device is not required to read the payload size register prior to each read operation. In another example, an optimal buffer size may be calculated based on expected TDC performance.

TDC may be performed in software, hardware, or in some combination thereof. A TDC engine may perform TDC operations in the touchscreen controller 216, a component associated with the touchscreen controller 216, and/or in the host processor 204.

According to certain aspects disclosed herein, the touchscreen controller 216 may analyze touchscreen data to determine whether the touchscreen data includes noise or unintentional touch inputs. These conditions may be ignored by both the touchscreen controller 216 and the host processor 204 and can be filtered and/or eliminated from the touchscreen data before or during TDC. Noise in touchscreen data may include erratic information that may be regarded as superfluous or useless data. For example, the touchscreen controller 216 may determine that several rapid tap touch inputs do not correspond to valid user touches and can be regarded as noise. In another example, placement of a whole hand on the touchscreen 104 may be regarded by the touchscreen controller 216 as a false positive. The selection of a TDC type and/or mode of operation may be informed by the distinctions drawn between noise and valid touches by the touchscreen controller 216.

Figure 3:
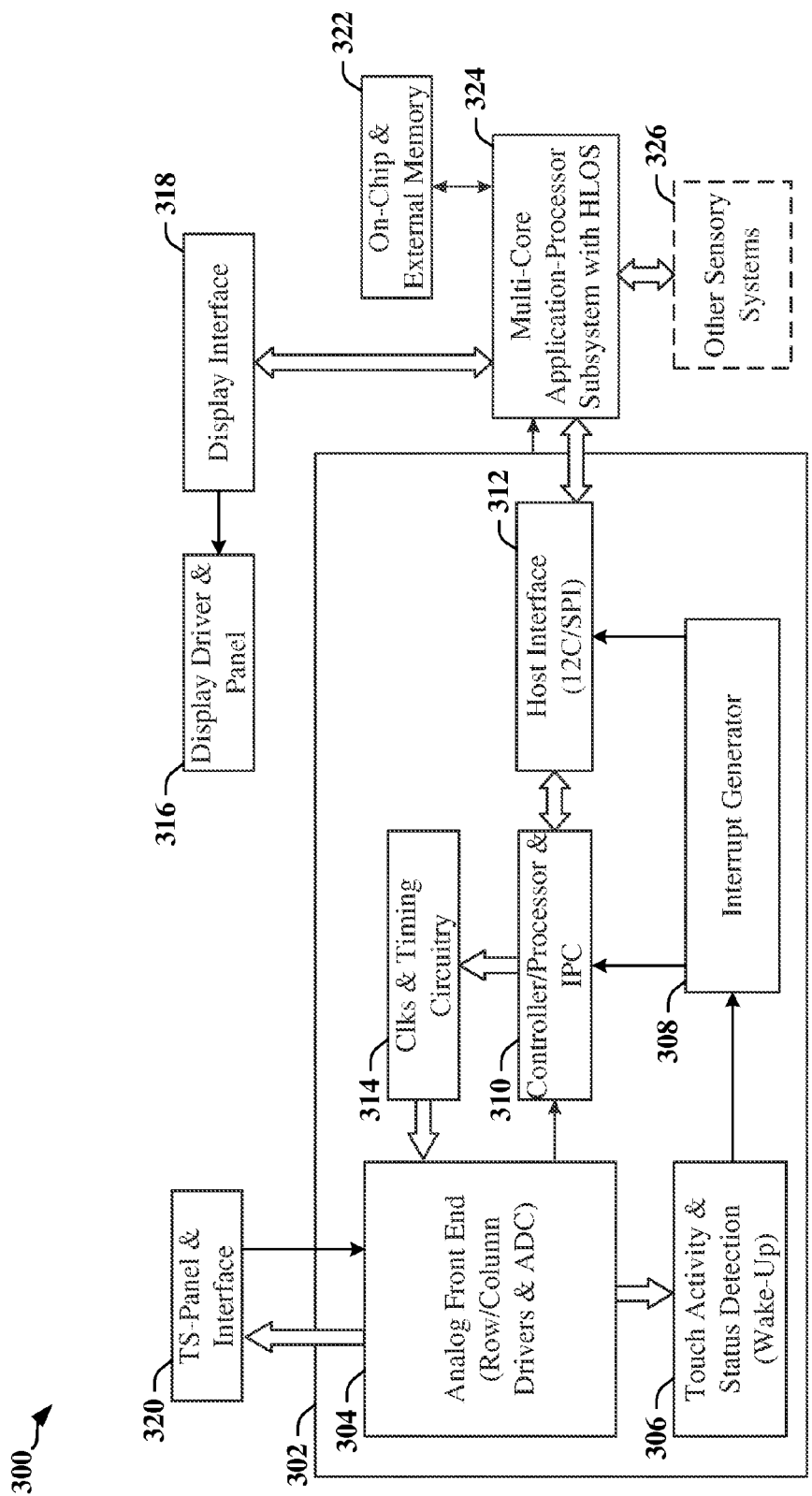
FIG. 3 is a block diagram illustrating a system architecture for an apparatus that may be adapted according to certain aspects disclosed herein.

FIG. 3 is a component block diagram of a touchscreen computing device 300 that may be adapted and/or configured according to certain aspects disclosed herein. The touchscreen computing device 300 may be comparable to the computing device 100 described in relation to FIG. 1, or any other computing device that cooperates with and/or includes a touchscreen panel 320, or otherwise receives touchscreen signals for processing. For example, a smart TV that has a connected touchscreen peripheral device may be considered a touchscreen computing device 300. The touchscreen panel 320 may include an interface for receiving user touch inputs based on detected tactile or near-tactile interactions. In one example, a user may apply fingers, stylus, or other physical implements to touch the touchscreen panel 320, which responds by generating touchscreen signals and/or touchscreen data.

The touchscreen panel 320 and associated interfaces may include touch sensors that employ one or more touch sensing techniques including resistive, surface capacitive, projected capacitive, infrared, surface-acoustic-wave, strain gauge, optical imaging, dispersive-signal-technology, etc. In one example, a resistive touchscreen panel 320 may detect touch inputs based upon detecting a physical depression on a surface caused by a user's finger on the touchscreen panel 320.

The touchscreen computing device 300 may include a touchscreen controller 302 that includes circuits and modules configured to receive and process touchscreen signals, including touchscreen data, from the touchscreen panel 320. For example, the touchscreen controller 302 may include an analog front-end circuit 304 configured to receive analog signals corresponding to detected touch inputs on the touchscreen panel 320. The front-end circuit 304 may include row and column drivers as well as other components, such as multiplexors, to categorize, combine, and/or otherwise convert the received signals into touchscreen data that can be processed digitally.

In operation, the analog front-end circuit 304 may receive the touchscreen signals, convert the signals to digital values using one or more analog-to-digital convertor (ADC) circuits. The front-end circuit 304 may transmit the digital values to a touch activity detection component 306. The touch activity detection component 306 may be configured to determine whether the touchscreen panel 320 has received touch inputs resulting from activity that may be associated with user interactions with the touchscreen panel 320.

In one aspect, the touch activity detection component 306 may determine activity by evaluating and differentiating temporal averages of reported touchscreen signals. For example, stored information received over a period of time may be evaluated to determine whether received touchscreen signals describe activity or represent errata. The touch activity detection component 306 may also communicate with an interrupt generator 308 that may be configured to transmit interrupt signals to a controller or other processor or processing circuit 310. The interrupt signals may be a component of, or initiate inter-processor communications (IPC) that is used to synchronize or coordinate activities between various components of the touchscreen computing device 300. For example, when a touch input is detected on the touchscreen panel 320 while the processing circuit 310 is configured to be in a sleep state or an idle mode, the interrupt generator 308 may send an interrupt signal indicating that there is touchscreen data available for processing and/or that prompts the processing circuit 310 to wake up. In some instances, the interrupt generator 308 may provide one or more signals to a host processor 324.

The analog front-end circuit 304 may additionally deliver touchscreen signals to the processing circuit 310. The analog front-end circuit 304 may deliver other signals representative of the touchscreen data corresponding to touch inputs detected on the touchscreen panel 320. For example, the analog front-end circuit 304 may process received touchscreen signals and transmit a data signal containing touchscreen data to the processing circuit 310. The processing circuit 310 may be configured to process touchscreen data and provide user input commands or data to an application processor 324 in a form that can be processed as user inputs by the operating system and/or applications. The processing circuit 310 may also evaluate touchscreen signals to determine whether touchscreen data represents valid information requiring processing, rather than useless noise. The processing circuit 310 may employ clock or timing circuits 314 and may transmit commands to the analog front-end circuit 304 based on information maintained by the clock or timing circuits 314.

The touchscreen controller 302 may include a host interface 312 that enables the processing circuit 310 to transmit user input data to the host processor 324. The user input data may relate to the location on the touchscreen of a user touch, for example. The host interface 312 may be configured to communicate using system component communication protocols, such as an inter-integrated circuit (I2C) protocol and/or a serial peripheral interface (SPI) protocol. The touchscreen controller 302 may include other components (not shown) such as a quantizer component, a horizontal integrator component, and a vertical integrator component, which may be controlled by the processing circuit 310 and which may scale touch inputs and/or touchscreen data to various resolutions. For example, touchscreen signals may be processed to obtain a scaled-down resolution of the touchscreen signals in order to increase the efficiency at which the processing circuit 310 handles touchscreen data. The touchscreen controller 302 may include components (not shown) that are configured to track and/or hold touchscreen signals (binning control) that may spatially integrate touchscreen signals and enable the touchscreen computing device 300 to reduce scan rates related to detecting touch inputs.

The host processor 324 may be provided as a processing circuit that is distinct from the processing circuit 310, and that includes a single or multi-core host processor. The host processor 324 may include any of a variety of programmable processors capable of running applications and an operating system for managing such applications. For example, the host processor 324 may persistently execute a high level operating system (HLOS) that may perform numerous routines to utilize the components and software of the touchscreen computing device 300. The host processor 324 may also store data within, and retrieve data from a memory component 322 that may include external memory, and/or on-chip memory.

The touchscreen computing device 300 may further include a display panel 316 and associated drivers that are configured to render various imagery. For example, the display panel 316 may include an LCD display capable of displaying a graphical user interface (GUI) for an application executed on the host processor 324. The host processor 324 may control the display panel 316 by transmitting data via a display interface 318 component which may include drivers and/or circuits that translate or process data for rendering by the display panel 316.

The host processor 324 may receive data from the processing circuit 310 that can be used by various applications executed by the host processor 324. In some instances, the host processor 324 may be configured to receive touchscreen signals and/or touchscreen data directly from components other than the processing circuit 310 in the touchscreen controller 302 to facilitate processing of touchscreen data. For example, the touchscreen computing device 300 may include a data path that directs raw touchscreen signals to the host processor 324. In some examples, the host processor 324 is coupled to other sensors 326, such as accelerometers.

The touchscreen computing device 300 may also include other components not shown in FIG. 3, such as application data movers for transferring various data from the host processor 324, a graphic processing unit (GPU) that process and generate data related to multimedia, and display-processors and/or controllers that may communicate display commands from the host processor 324 to the display interface 318.

Figure 4:
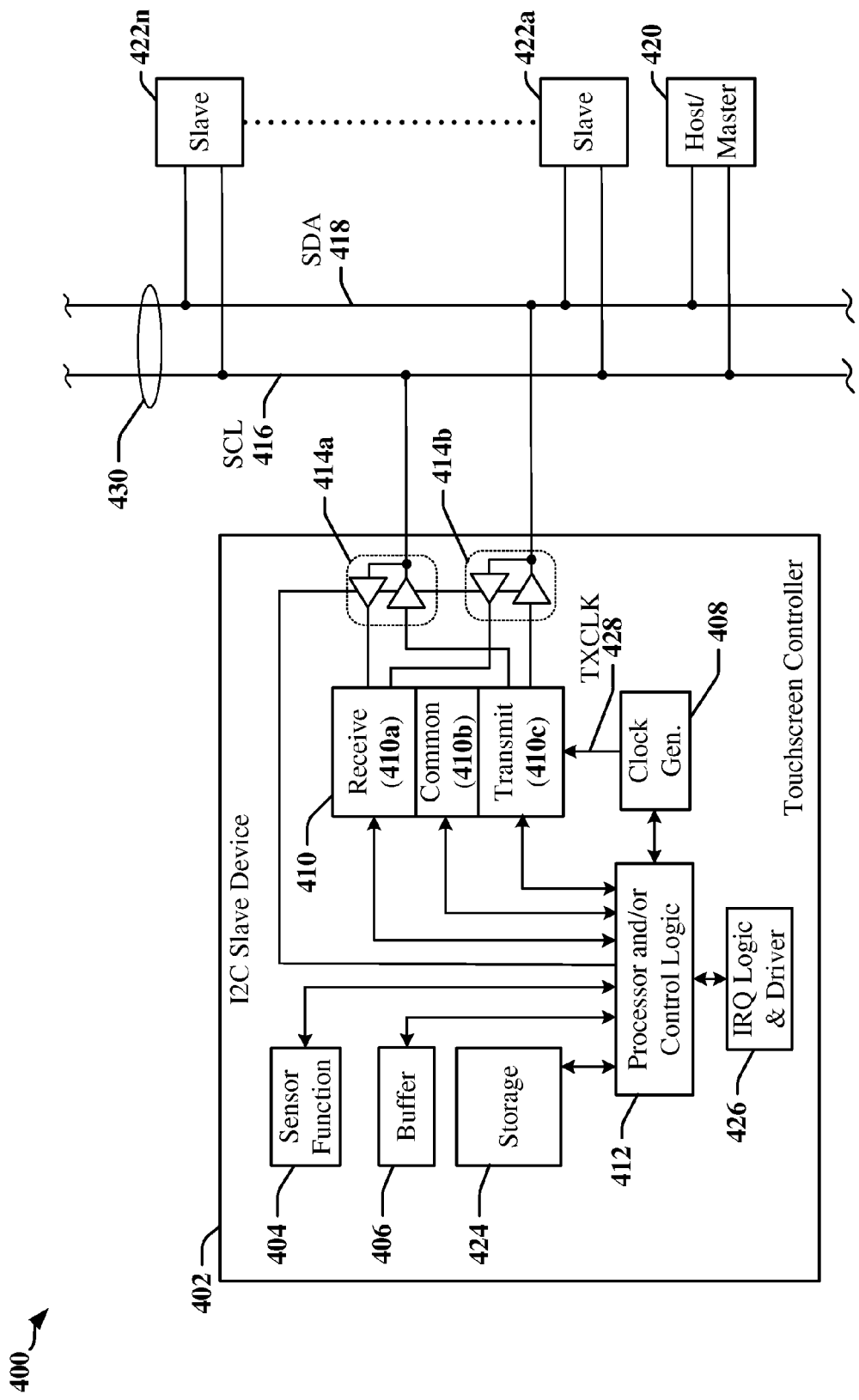
FIG. 4 illustrates a configuration of devices in an apparatus employing a data link between IC devices according to certain aspects disclosed herein.

Referring to FIG. 4, and in accordance with certain aspects disclosed herein, TDC may be employed to optimize communications over low speed interface pipes such as an I2C bus 430. In one example, a touchscreen controller 402 may be provided in a stand alone integrated circuit (IC) device that drives the touch sensors of a touchscreen, reads the data and processes the data in order to provide information to a host processor 420, including information such as x and y coordinates. The touchscreen controller 402 may provide a matrix of numbers to the host processor 420. As sampling rates, resolution (i.e. bits to represent each node), and/or the density of nodes (i.e. number of individual sensors) in the touch screen increase, the desired or required overall data transfer rate may also increase. Conventional or legacy interfaces such as the I2C bus may be unable to transfer all of the available data within time constraints such as a specified touchscreen frame rate. Continued use of legacy interfaces may be desirable because of the low power usage associated with such interfaces, and because such interfaces can be less expensive to implement than more recent interfaces. Compression techniques such as the TDC described herein can support lightweight, lossless, real-time communication of touchscreen data.

In FIG. 4, an I2C bus 430 may be employed by an apparatus 400 embodied in a wireless mobile device, a mobile telephone, a mobile computing system, a wireless telephone, a notebook computer, a tablet computing device, a multimedia player, a gaming device, a wearable computing device such as a smart watch, an appliance, or the like. The apparatus 400 may include multiple devices 402, 420, and/or 422a-422n, which communicate using the I2C bus 430.

A touchscreen controller 402 may be configured to operate as a slave device on the I2C bus 430. The touchscreen controller 402 may be adapted to provide a sensor control function 404 that manages a touchscreen sensor, for example. In addition, the touchscreen controller 402 may include a touchscreen data buffer 406 and/or other storage devices 424, a processing circuit and/or control logic 412, a transceiver 410 and line drivers/receivers 414a and 414b. The processing circuit and/or control logic 412 may include a processor such as a state machine, sequencer, signal processor or general-purpose processor. The transceiver 410 may include a receiver 410a, a transmitter 410c and certain common circuits 410b, including timing, logic and storage circuits and/or devices. In some instances, the transceiver 410 may include encoders and decoders, clock and data recovery circuits, and the like.

A transmit clock (TXCLK) signal 428 may be provided to the transmitter 410c, where the TXCLK signal 428 can be used to determine data transmission rates for an I2C communication mode. The TXCLK signal 428 may be generated by clock generation circuits 408, which may also provide clock signals for the sensor function 404 and/or an associated touchscreen panel. The touchscreen controller 402 may include IRQ generation logic and divers 426.

The I2C devices 402, 420, and/or 422a-422n may communicate using the two-wires 416, 418 of a control data bus 430. For example, the two-wire control data bus 430 may support I2C bi-directional, half-duplex modes of communication. Certain I2C devices 420 may be configured as a bus master, and certain devices 402, and/or 422a-422n may be configured as slave devices.

Certain aspects disclosed herein relate to methods and apparatus that employ lossless TDC with real-time performance levels. In one mode of operation, TDC produces fixed-length compressed frames that can reduce or eliminate latencies. Frame lengths may be predefined, negotiated between sender and receiver, and/or adapted during operation. The compressed frames may be transmitted between different components 402, 420 of a mobile computing device. The components 402, 420 may include IC devices such as a touchscreen controller 402 and a host processor 420.

In one example, a touchscreen panel provided for a 720$p$ display system may generate touchscreen data at a rate of between 60 and 120 frames per second, each frame including 30×16 nodes. Each node may be represented by 16 bits of data. At 120 frames per second, 922 kbps may be required to handle the touch data, and the addition of overhead associated with the data-link protocol may cause bandwidth requirements to exceed the available bandwidth of a 1 MHz I2C bus 430. Moreover, the data link is likely to be always active in order to cope with a likely touchscreen frame rate, which may present a challenge to the system power budget.

According to certain aspects disclosed herein, TDC may be implemented in a manner that produces a sequence of fixed-length frames with lossless, real-time, touch data compression. TDC can achieve 40% compression efficiencies. The fixed frame length may be predefined, preconfigured and/or negotiated between devices involved in communication of touchscreen data. In one example, the frame length may be fixed based on the size of an I2C frame required to transmit a raw touchscreen data frame. The use of compression may cause underflow whereby a certain portion of the I2C frame may be unused and/or filled with null or random values in another example, the frame length may be fixed based on an optimized or average size of I2C frames expected for transmitting compressed touchscreen data frames. In this latter example, underflow and overflow may occur. In the case of overflow, the transmitter may signal a receiver that an overflow I2C frame is to be transmitted, and that the first transmitted frame does not include a complete touchscreen data frame.

Modes of Compression

In a temporal compression mode of operation, a touchscreen controller 216 may transmit a first frame that is uncompressed (i.e. a "raw frame"), followed by a number of difference frames, where each difference frame represents differences calculated between the nodes of adjacent frames.

For example, a first raw frame generated by the touchscreen controller may be sent as an uncompressed frame. A second raw frame generated by the touchscreen controller may be compared to the first raw frame and differences between the frames may be calculated for all of the nodes represented in the frames. The differences may be sent over the control data bus 208 as a difference frame in place of the second raw frame. A next difference frame transmitted in place of a third raw frame may be generated based on the differences between the third raw frame and the second raw frame. A fixed frame size permits an I2C master device to read TDC frames from a slave device without first receiving information from the slave device specifying the size of the frames.

Certain additional procedures can increase efficiency of TDC. In one example, noise suppression techniques may be employed to filter noise occurring at one or more nodes. Noise may include erratic information that does not represent valid touch input data but instead can be attributed to variations caused by electrical, electrostatic, moisture-related effects, or the like.

In some instances, TDC may employ variable length encoding for the difference frames. The size of each difference value may be encoded in a value having N bits (including a sign bit). The value of N may be predefined, preconfigured, pre-negotiated, determined during a calibration process and/or adapted during operation. In one example, the 16-bit raw data representing each node in a raw frame may be initially compressed to a 12-bit value. In some instances, raw data is compressed to obtain compressed node values, and the maximum absolute value of all compressed node values in a difference frame (MAX_DIFF) may be calculated to determine if the difference frame can be encoded using the N-bit representations of the differences at the nodes. If the MAX_DIFF cannot be accommodated in N bits, a raw frame may be sent. The type of frame may be identified in a frame header. In some instances, the receiver may use header information to distinguish between raw frames and difference frames, and any number of difference frames may be sent between raw frames. In other instances, the system may be configured to send a predetermined number (8, 9, 10, etc.), or predetermined maximum number of difference frames between raw frames.

In a spatial compression mode of operation, frames may be compressed by calculating differences between neighboring nodes on a row or column of one frame, or within one of a plurality of blocks of nodes in the frame. For one-dimensional spatial compression, differences between neighbors in the same row or column are calculated. The maximum and/or minimum difference may be determined as an absolute value and the number of bits required to encode the maximum value plus a sign bit is used to determine the size of each data element used to represent the differences between nodes. The value of N may be determined by the maximum of the MAX_DIFFs calculated for the rows or columns of the frame. Spatial compression may be applied in two dimensions (e.g. block compression) in some instances.

Temporal Mode Compression

Figure 5:
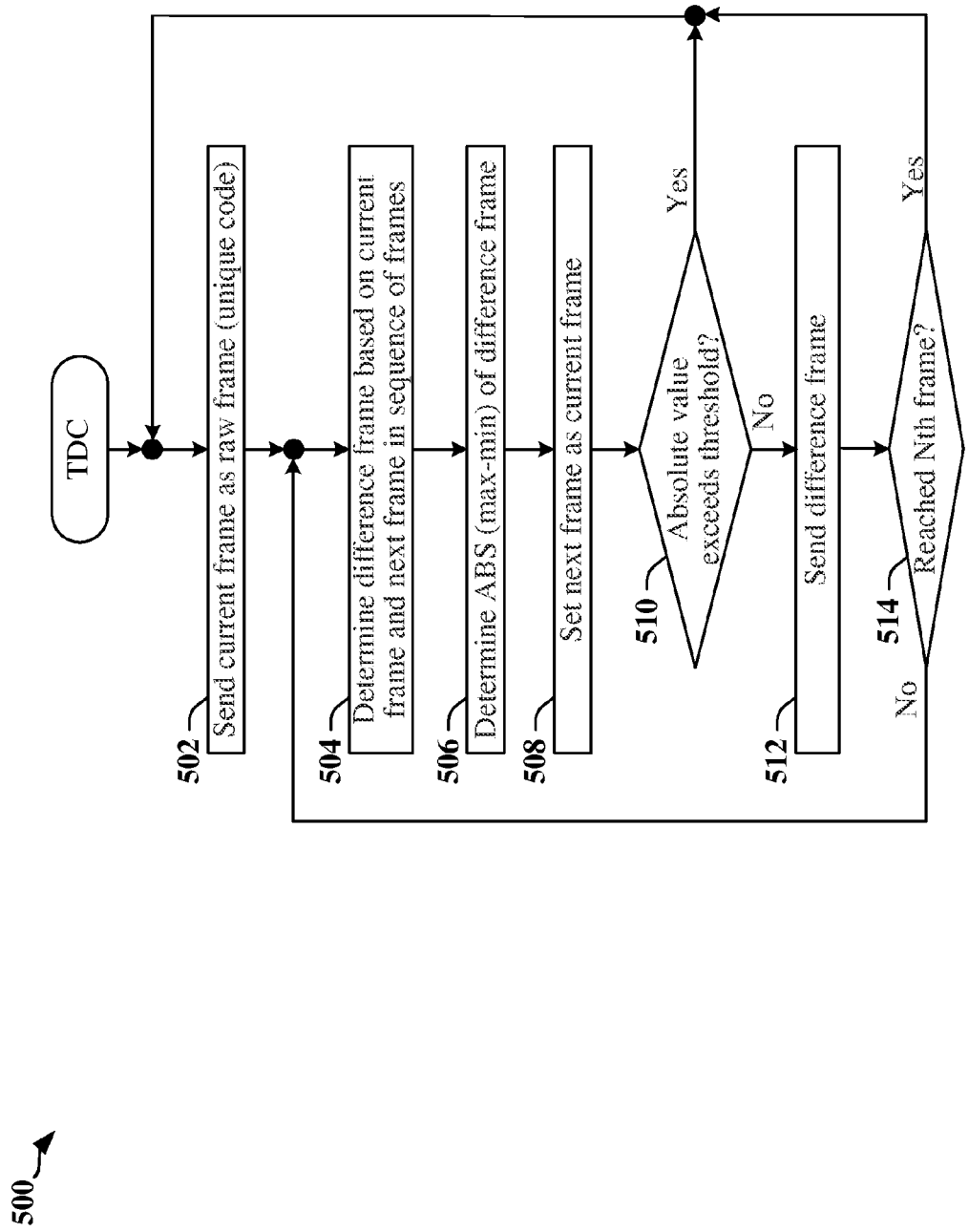
FIG. 5 is a flowchart illustrating a method for temporal touch data compression according to certain aspects disclosed herein.

FIG. 5 is a flowchart 500 illustrating a temporal mode of operation for TDC in accordance with certain aspects disclosed herein. TDC may be performed by the touchscreen controller 216 of FIG. 2 prior to transmission of touchscreen data to a baseband processor 204. At block 502, a touchscreen controller 216 may send a first frame to a processing circuit with a unique code indicating that the frame includes raw uncompressed touchscreen data. The unique code may be provided in a header of the first frame. The first frame may be designated the current frame and a copy of the first frame may be stored. At block 504 the touchscreen controller 216 may then determine a difference frame that includes difference values for each node. The difference value at each node may represent a mathematical difference between the value associated with the node in the stored copy of the first frame and the value associated with the same node in a second frame. In one example, the second frame may include touchscreen data captured immediately after the touchscreen data in the current frame is captured. The touchscreen frame rate may determine the number of frames of touchscreen data captured per second.

At block 506, the touchscreen controller 216 may calculate a maximum difference for the difference frame. The maximum difference may correspond to a difference between the greatest value found in the difference frame and the least value found in the difference frame. The maximum difference may be expressed as an absolute value, which may be expressed as the abs(max-min) of the difference frame. At block 508, a copy of the second frame is stored and the second frame is designated as the current frame.

At block 510, the touchscreen controller 216 may determine whether the absolute value representing the maximum difference exceeds a threshold value. The threshold value may correspond to the maximum numerical value of a word that can be encoded in a predefined fixed length frame of touchscreen data to be transmitted over the control data bus 430. In one example, the threshold may be a predetermined value of 128 that can be encoded in 8 bits including a sign bit, such that values of ±128 can be encoded. In another example, the threshold may be predefined to be 512 that can be encoded in 10 bits including a sign bit, such that values of ±512 can be encoded. If the threshold is exceeded, a raw frame may be sent and, accordingly, the process returns to block 502. If the threshold is not exceeded, then the process proceeds to block 512, where the touchscreen controller 216 may send the difference frame.

At block 514, the touchscreen controller 216 may optionally determine a number of difference frames that have been sent consecutively. If the number is less than a preconfigured or predefined threshold number N, then one or more additional difference frames can be sent and the touchscreen controller 216 may continue the process at block 504. Otherwise, the touchscreen controller 216 may be configured to transmit at least one raw frame for every N difference frames sent and the touchscreen controller 216 may return the block 502. In some instances, the touchscreen controller 216 may be configured to continue to transmit compressed until it is determined in block 512 that a raw frame should be sent due to the number of bits required to encode a difference value calculated between a corresponding node in two consecutive raw frames.

In one example, the touchscreen controller 216 may calculate a difference between adjacent frames and send difference frames after a first raw frame. Raw frames may be distinguished from difference frames based on a header, which may include a unique code. The unique code may have any desired length and may, in one example, be carried as a 16-bit value. In the examples described, the thresholds may be set according to application needs and the values illustrated are intended as examples selected from a wide range of possible configurations. In some instances, a touchscreen controller 216 may notify the master device (e.g., host processor 204) of the length of data to be read for difference frames. The length to be read may be determined based on the parameters employed by the touchscreen controller 216 when executing the TDC, a desired or specified touchscreen frame rate, a history of compression ratios achieved, calibration and/or based on other indicators or parameters.

At the receiver, which may be a host or baseband processor 204, decompression commences with the first difference frame received after a raw frame. The raw frame is used as a basis for decompression and, each decompressed frame may be used as a basis for decompressing the next difference frame received. The transmission of a raw frame after N consecutive difference frames permits a checkpoint to be established. The checkpoint can be used for error recovery purposes. The value of N may be a predetermined or configurable value.

Spatial Mode Compression

Figure 6:
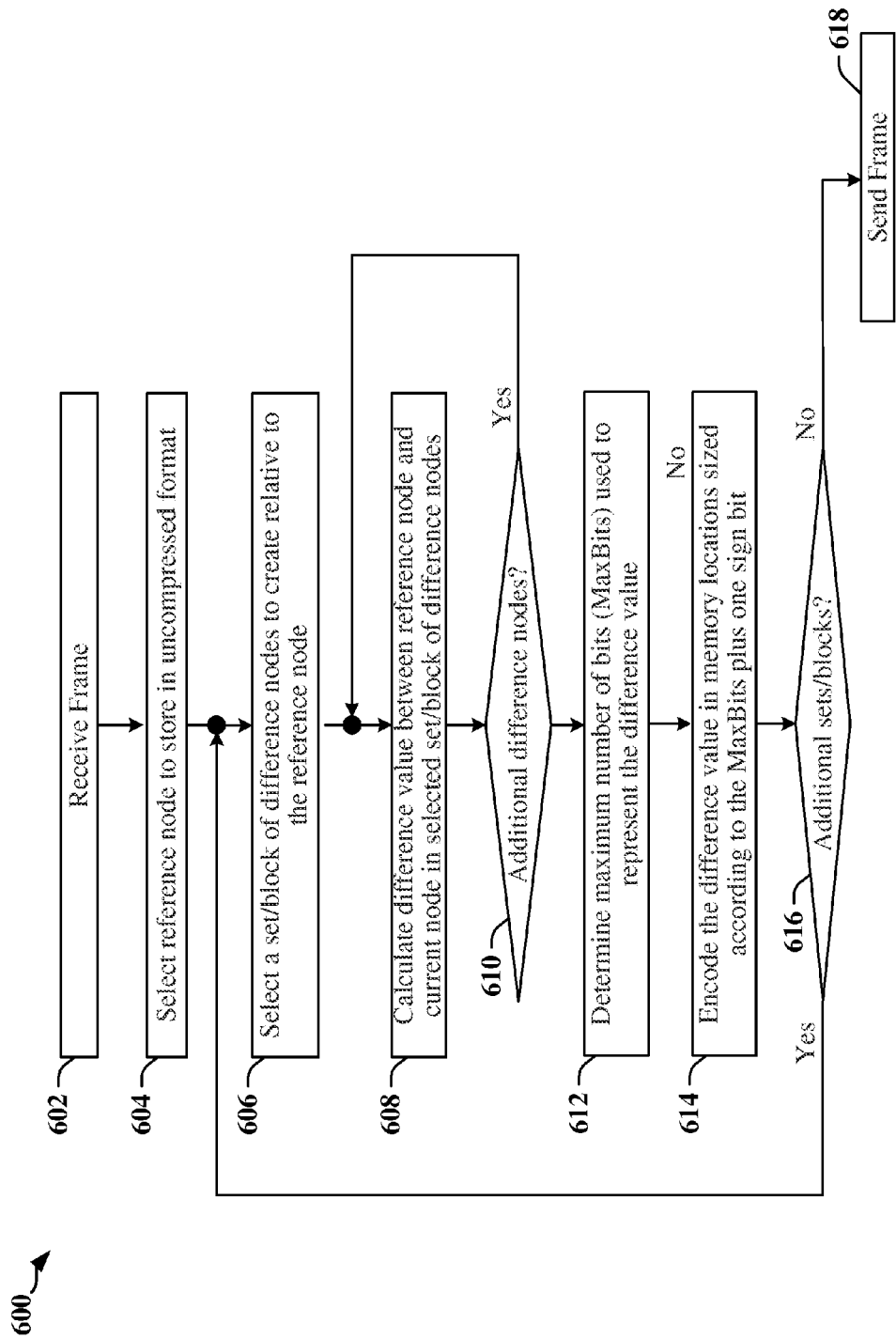
FIG. 6 is a flowchart illustrating a method for spatial touch data compression according to certain aspects disclosed herein.

FIG. 6 is a flowchart 600 illustrating a spatial compression mode of operation for TDC in accordance with certain aspects disclosed herein, TDC may be performed by the touchscreen controller 216 of FIG. 2 prior to transmission of touchscreen data to a host or baseband processor 204. At block 602, a touchscreen controller 216 may receive an input frame. The touchscreen controller 216 may process the frame, to obtain a preferred or desired data format. In one example, the touchscreen controller 216 may modify the bit order (endianness) of data within the frame. In another example, the touchscreen controller 216 may pack the data within the frame. Packing may include packing two 16-bit words carrying 12-bit representations of node values into three eight-bit bytes.

At block 604, the touchscreen controller 216 may select one or more reference nodes from the frame. The reference node may be stored in uncompressed format.

At block 606, the touchscreen controller 216 may select and/or configure a set of nodes for processing. The set of nodes may also be referred to as a block of nodes when the set of nodes is arranged in two dimensions within the touchscreen panel. The set of nodes may be processed in relation to a reference node to obtain a set of difference nodes. In one example, the set of nodes may be one of a plurality of sets of nodes selected from a grid covering the entire frame, where each set of nodes includes a predefined number and/or arrangement of nodes, such a 2×2 set of nodes or a 4×4 set of nodes, in another example, the set of nodes may include a row or a column of nodes. The row or column of nodes may correspond to a geometric arrangement of nodes within a touchscreen panel, for example. In some instances, the reference node may be the first node in a selected set of nodes. In some examples, the reference node may be a node located at a predefined position within each set of nodes in the frame.

At block 608, the touchscreen controller 216 may calculate the difference value for a current node in the set of nodes to obtain a corresponding difference node. The difference node may be calculated with respect to one or more adjacent nodes in the set of nodes, and/or with respect to all of the nodes in the set of nodes. At block 610, the touchscreen controller 216 may determine if additional difference nodes are to be calculated within the current set of nodes. If additional nodes are to be processed, then the touchscreen controller 216 may return to block 608. If processing for the current set of nodes has been completed, then the touchscreen controller 216 may proceed to block 612.

At block 612, the touchscreen controller 216 may determine a maximum difference value for a set of difference nodes calculated from the current set. From this maximum value, the touchscreen controller 216 may determine the number of bits (MaxBits) needed to encode the absolute values of the difference nodes. The number of bits required to represent and/or store the difference nodes may be MaxBits+1 to provide an extra sign bit. Then at block 614, the touchscreen controller 216 may encode the difference values for each node as a set of difference nodes, which may be stored in a buffer or memory sized according to the MaxBits value.

At block 616, the touchscreen controller 216 may determine if additional sets of nodes remaining in the frame are to be processed. The additional sets may be provided within an input queue, for example. The touchscreen controller 216 may return to block 604 when additional unprocessed sets of nodes are available. If all sets of nodes in the frame have been processed, then the touchscreen controller 216 may transmit a compressed frame constructed from the difference nodes at block 618. The site of the difference values in the compressed frame may be determined by the MaxBits with the greatest absolute value.

In one example, TDC may be applied to a frame that is processed row-by-row. Each row may include digital representations of nodes that are physically arranged in substantial linear alignment, stretching from a first side of a touchscreen panel to a second side of the touchscreen panel. In the example, a touchscreen controller 216 may swap bytes from big-endian representation to little-Indian representation. The nodes may be represented by 12 bits that are stored in 2 bytes. When processing a row, the touchscreen controller 216 may select a reference node. The reference node may be the first node in the row, which may be the physically closest to the first side or closest to the second side of the touchscreen panel. The reference node may be represented in the transmitted frame by a raw value, as provided by an ADC of an analog front-end circuit 304, for example (see FIG. 3). Next, the touchscreen controller 216 may calculate the difference values between adjacent nodes in the row, commencing with the reference node and its neighboring node in the row. In some instances, the touchscreen controller 215 uses the absolute difference value to determine the number of bits required to store the difference value calculated for each pair of adjacent nodes, and can later select the lamest of number of storage bits required as MaxBits. In other instances, the touchscreen controller 216 may find the maximum value for the row after calculating all of the differences in the row, and may then calculate MaxBits based on the maximum absolute difference value. The size of storage required for each node representation may be calculated as MaxBits+1, in order to support signed representations.

In some examples, the size of storage used for each row may be the same, and the touchscreen controller 215 may determine the storage size based on the maximum of the MaxBits calculated for all of the rows in the frame.

In other examples, the size of storage used for each row may be provided in a value transmitted preceding the row difference values. Accordingly, each row may require different amounts of storage in a transmit buffer. A value of '0' for storage size may indicate that all nodes in the row have the same value as the reference node. In some instances, TDC may be performed on columns rather than rows when, for example, processing and/or compression efficiencies may be obtained through the organization of the nodes in columns.

TDC can achieve a compression ratio of 2 for a complete frame. Payload size may change with each frame, and each frame may require different amounts of storage in transmit and receive buffers. Accordingly, it may be necessary to inform the master device 204 of the frame size before each transmission. In one example, a one-frame delay is introduced when information identifying data payload length is transmitted before a frame of touchscreen data. The resultant latency may be offset by the reduced payload size. For example, the difference nodes may be represented using 10-bit values, while raw node difference values are transmitted in 16 bits.

In some examples, latency can be reduced by fixing the number of bytes or bits available for payload. In one example, 10 bits may be provided to represent each difference value.

Figure 7:
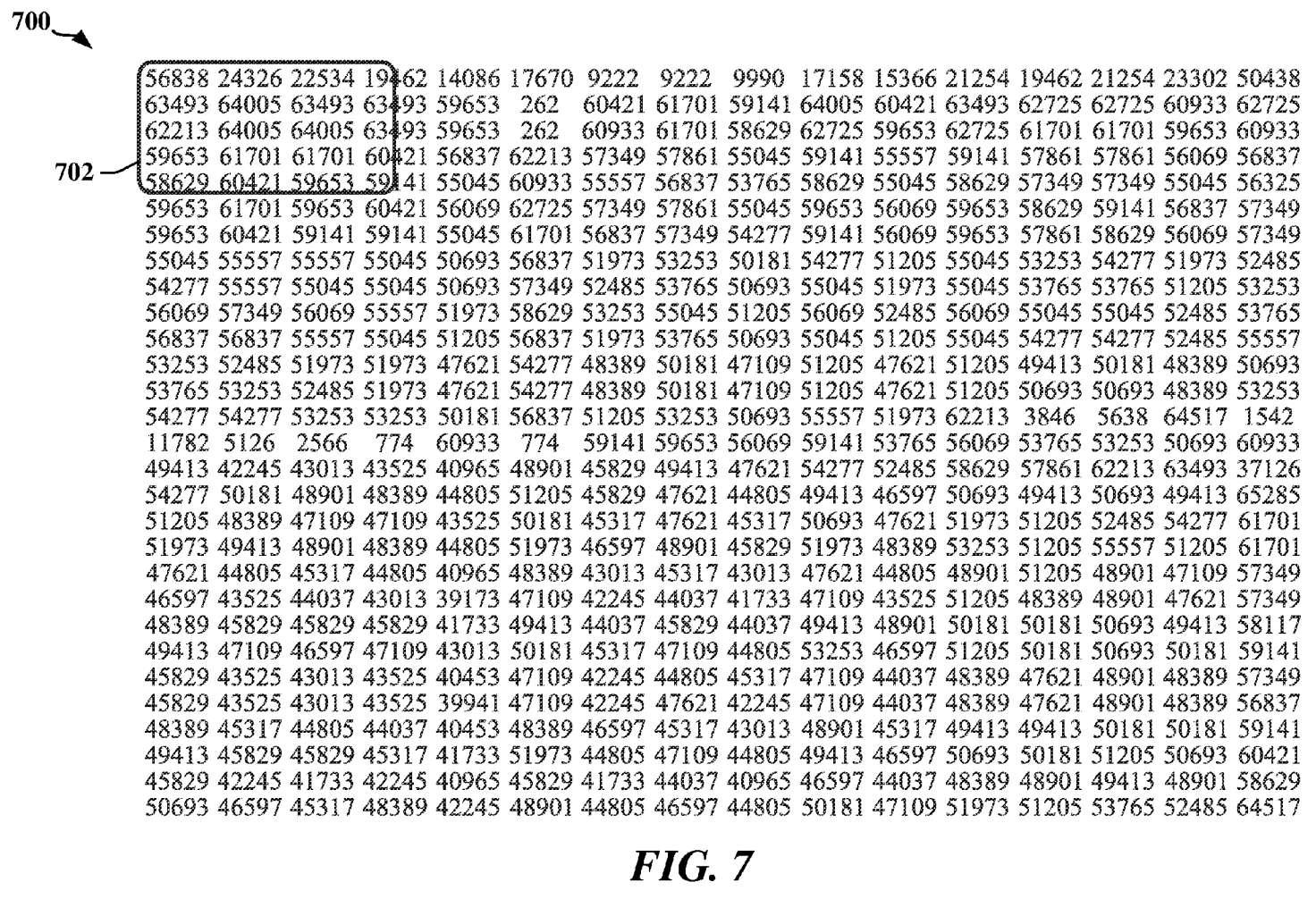
Figure 8:
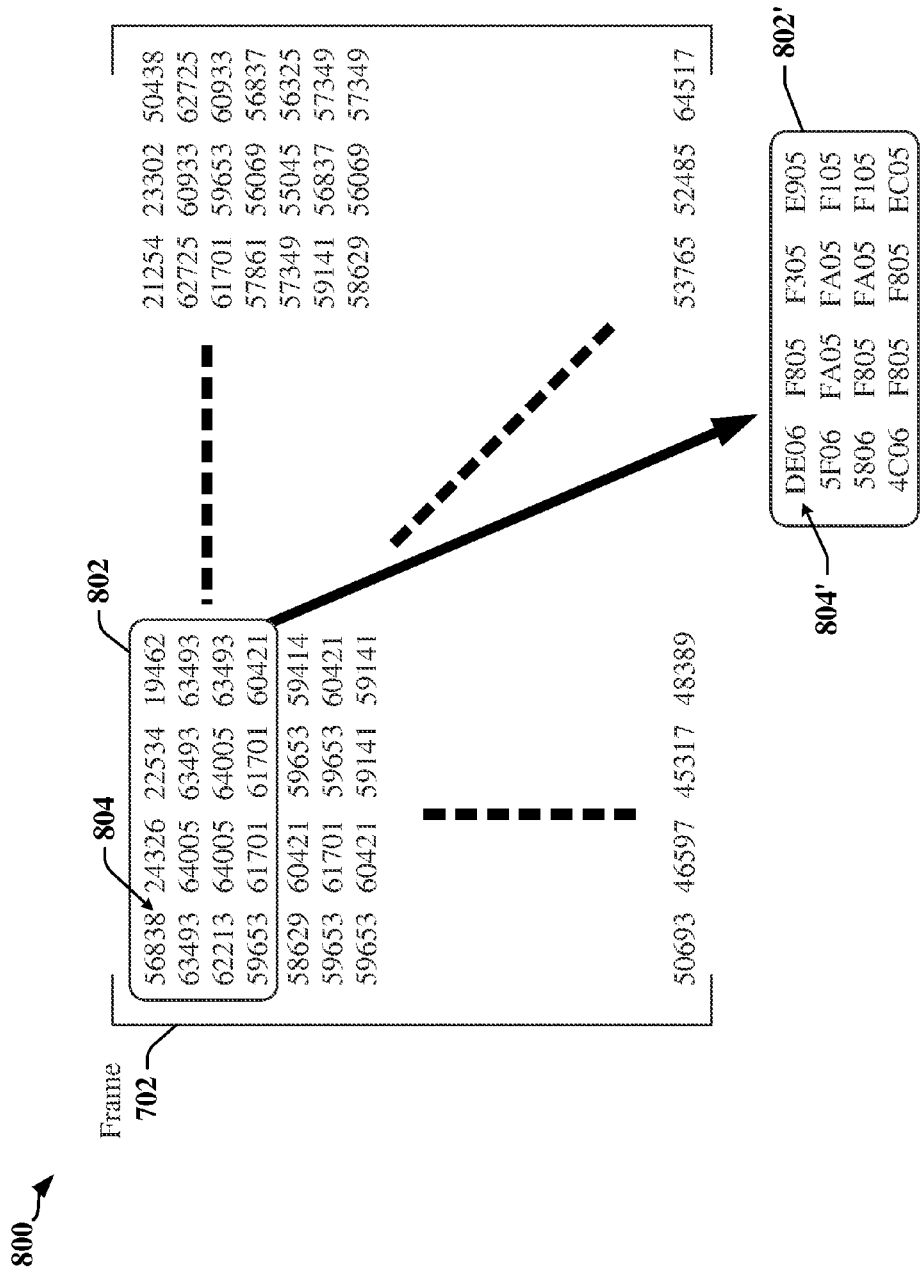
FIG. 8 illustrates a portion of the touchscreen data frame of FIG. 7.

FIG. 7 illustrates an example of a raw touchscreen data frame 700 and FIG. 8 is a diagram 800 that illustrates a portion 702 of the touchscreen data frame 700 in more detail. The touchscreen data frame 700 may include 30×16 node values. This configuration of the touchscreen data frame 700 is presented for the purpose of illustration only, and the concepts described herein are generally applicable to touchscreen data frames with different dimensions. Each node in the illustrated touchscreen data frame 700 may be represented by 16 bit values, although other data sizes may be selected. For the purposes of this description, the raw node values in the touchscreen data frame 700 may be assumed to be stored in big endian format.

In the illustrated touchscreen data frame 700, the values may lie in the decimal range 0 to 65,535. For example, the binary numbers in a block of node representations 802 include a node representation 804 having a value 56838. In hexadecimal format, the node representation 804' in the equivalent block of node representations 802' has a value of 0xDE06. Processing of the block of node representations 802' is described further here below.

Figure 9:
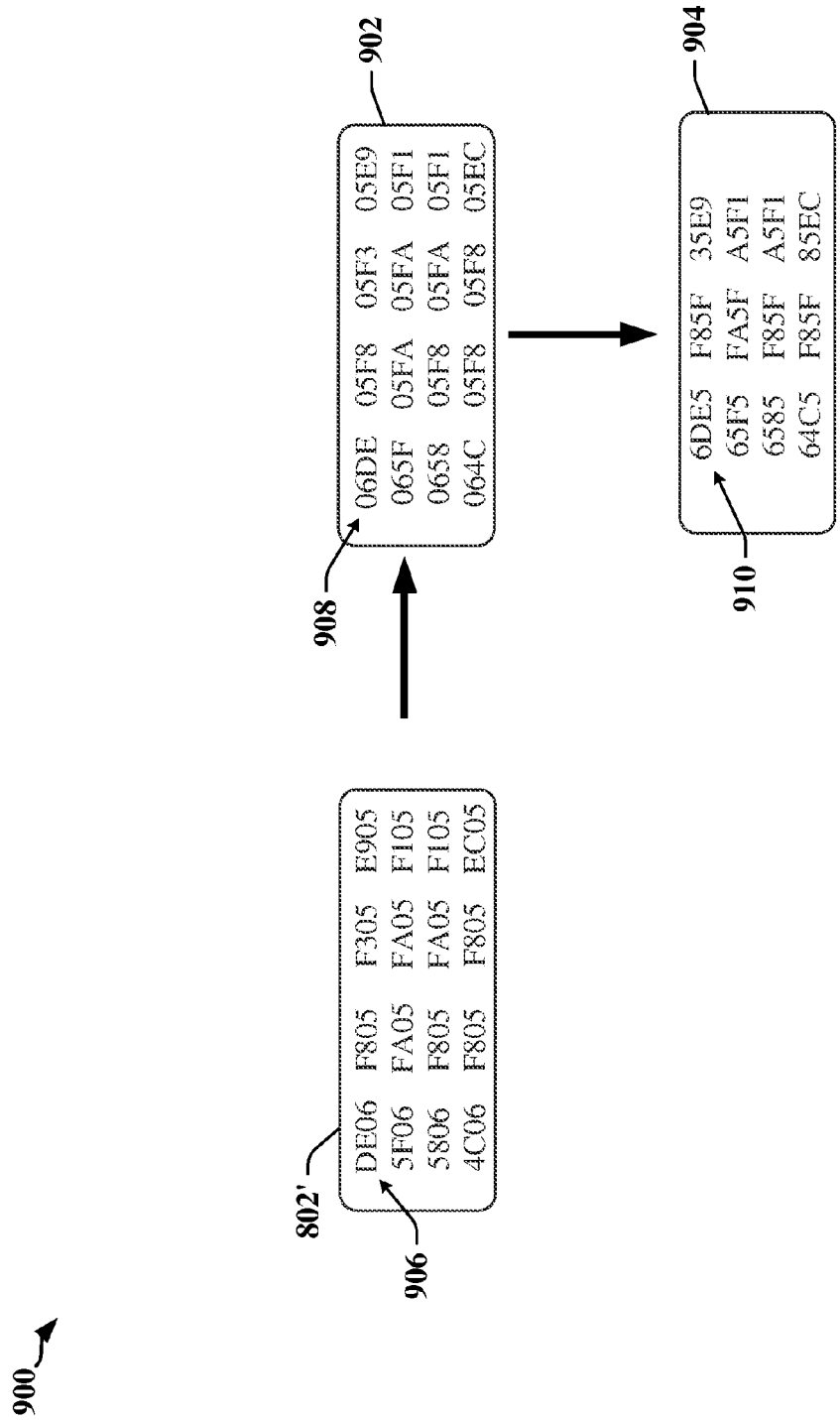
FIG. 9 illustrates preprocessing applied to a portion of the touchscreen data frame of FIG. 7 in accordance with certain aspects disclosed herein.

FIG. 9 illustrates one example of preprocessing of the block of node representations 802' prior to compression. In the example depicted, the block of nodes 802' may be in 16-bit big-endian mode and a conversion to a block of packed little-endian representations 904 may be desired. The endianness of the block of node representations 802' may be changed first. Each node in the initial block of nodes 802' is represented by a 2-byte, 16-bit value 906, and in a first step, the bytes of the representations 906 may be swapped to obtain a little-endian block of node representations 902. Next the node values 908 in the little-endian block of node representations 902 may be stripped of redundant, unused or unnecessary data bits to obtain a packed little-endian block of node representations 904. For example, two 12-bit representations of node values may be packed into three bytes. A compression ratio of 1.33 may be achieved after processing the raw block of node representations 802' to obtain the packed block of node representations.

Figure 10:
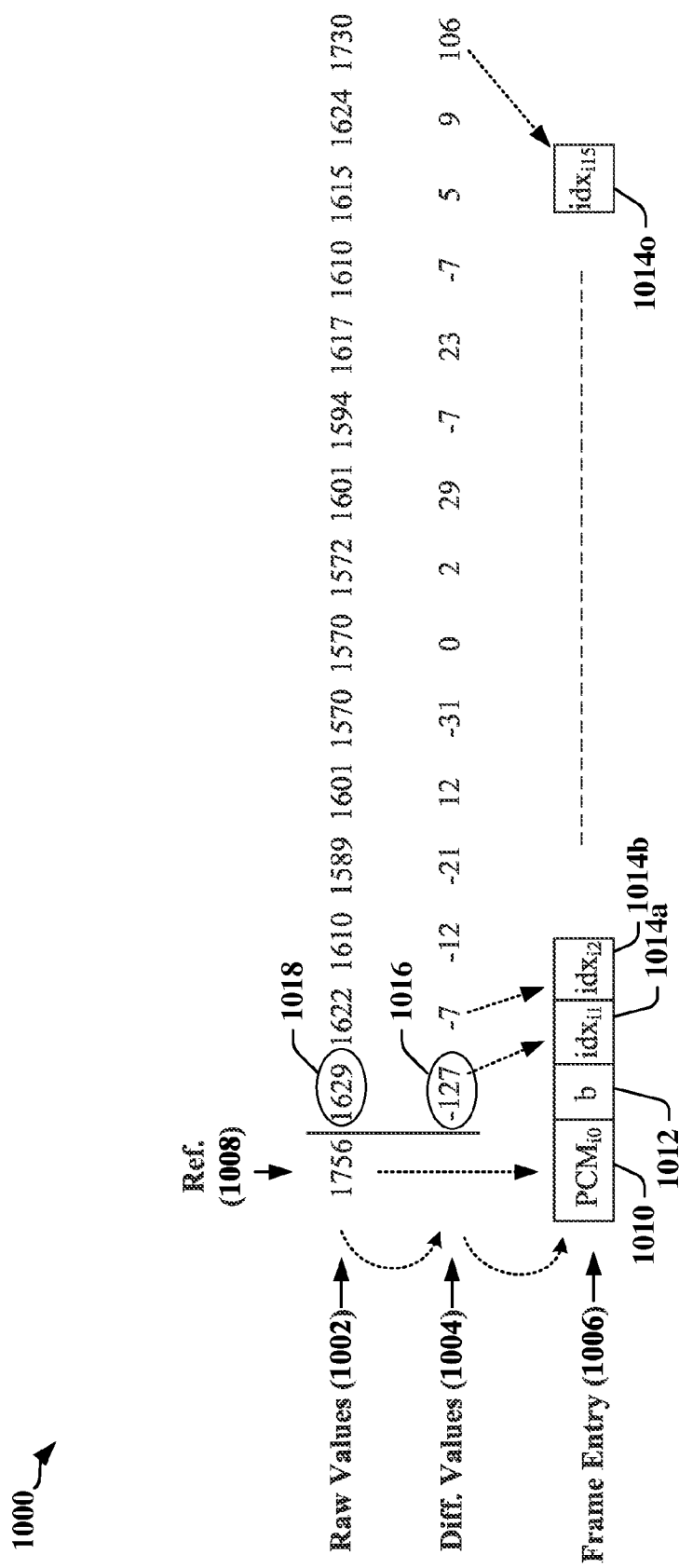
FIG. 10 illustrates the use of touchscreen compression to process raw node values corresponding to a row of sensors or nodes on a touch screen panel in accordance with certain aspects disclosed herein.

FIG. 10 illustrates an example 1000 in which TDC is applied to raw node values 1002 corresponding to a row of 16 sensors/nodes on a touch screen panel. In the example, the first node value 1008 in the row of nodes is selected as the reference node. The value of the reference node 1008 is transmitted as a raw value 1010 in $PCM_{i0}$, where the value of i may represent the row number within a frame. Each of the other nodes in the row may be represented by a difference value 1004 obtained by subtracting, or otherwise comparing, the value of a current node from a next, adjacent node. In one example, the difference value 1016 for the node value 1018 that is located adjacent to the reference node 1008 may be calculated as 1629−1756=−127. The number of bits required to store each difference value 1004 may be determined by the largest absolute difference 1016 in the difference values 1004. In the example 1000, the largest absolute difference 1016 is 127, which corresponds to a 7 bit binary number. The signed difference values may be stored as 8 bit values $idx_{i1}$, $idx_{i2}$ . . . , $idx_{i15}$) 1014a, 1014b, . . . , 194o in the frame entry for the current row 1006. The size of the signed difference values may be represented in a field 1012 of the frame entry for the current row 1006.

Figure 11:
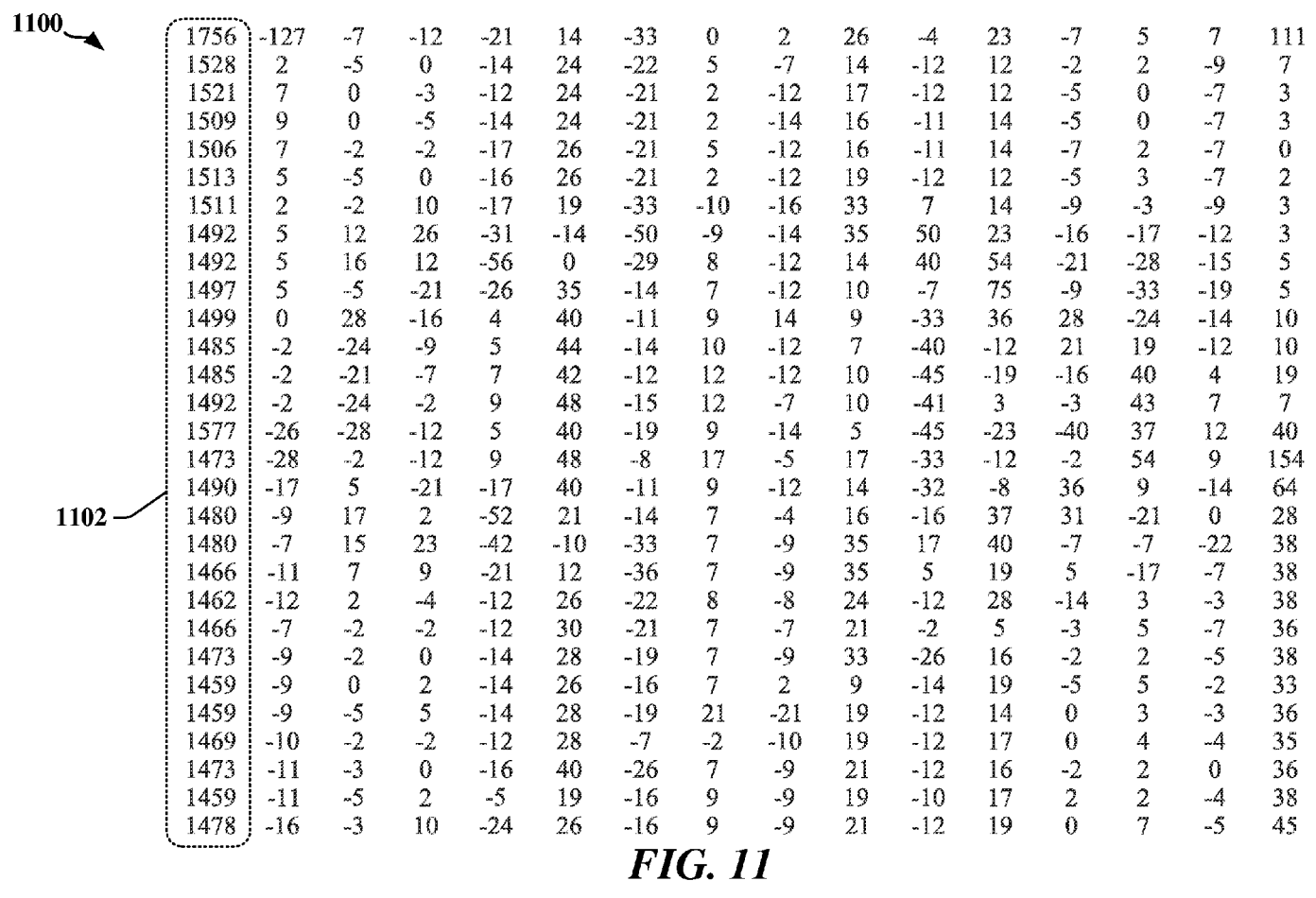

FIG. 11 illustrates a compressed frame 1100, in which compression is applied on a row-by-row basis. The first node 1102 in each row is the reference node. In one example, each node may be one of a set of nodes within a grid. In the example depicted, the grid may be configured in an arrangement of 30×16 nodes. These nodes may be interpolated to cover various sizes of displays, including for example, displays having 720 P, 1080 P, and/or other resolutions.

Preprocessing Compression

Figure 12:
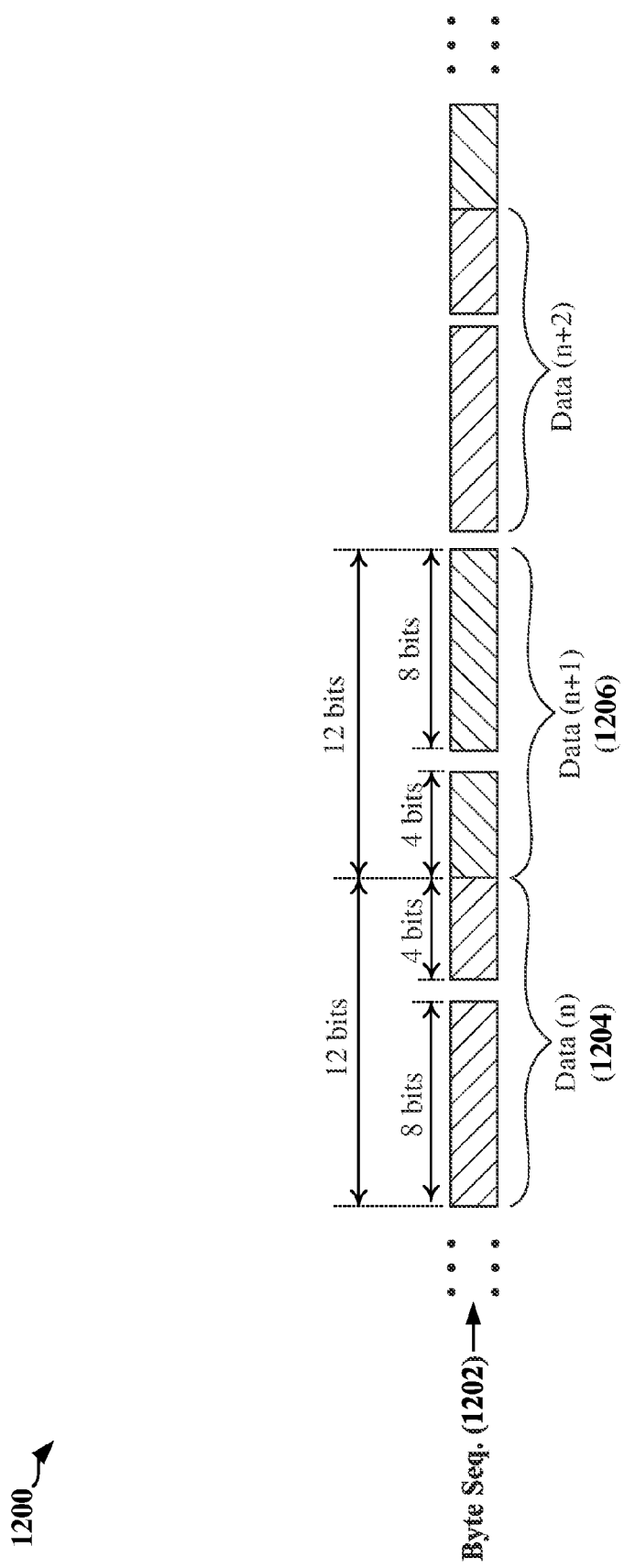
FIG. 12 illustrates certain aspects of preprocessing compression according to certain aspects disclosed herein.

FIG. 12 illustrates certain aspects of preprocessing compression. Preprocessing compression includes certain procedures and data handling that may be employed to reduce the amount of data representing a raw frame, without modifying the values representing the nodes in the raw frame. In one example, preprocessing compression may include reading 12 bits of data that has been zero-extended to fill 16 bit words. The data in the 16 bit words may be packed by removing the four most significant zero bits and combining data from two nodes 1204, 1206 into three 8-bit bytes in a sequence of bytes 1202 to be transmitted on an I2C bus, for example. The node data 1204, 1206 crosses byte boundaries upon packing. An automatic compression ratio of 1.33 can be achieved by such preprocessing, and compression ratios of this magnitude may provide an additional transmission capacity of 260 kilobits per second (kbps). In some instances, the compressed data size may be calculated and the compressed data values can be packed such that more than 4 most significant zero bits can be eliminated from the transmission buffer.

Figure 13:
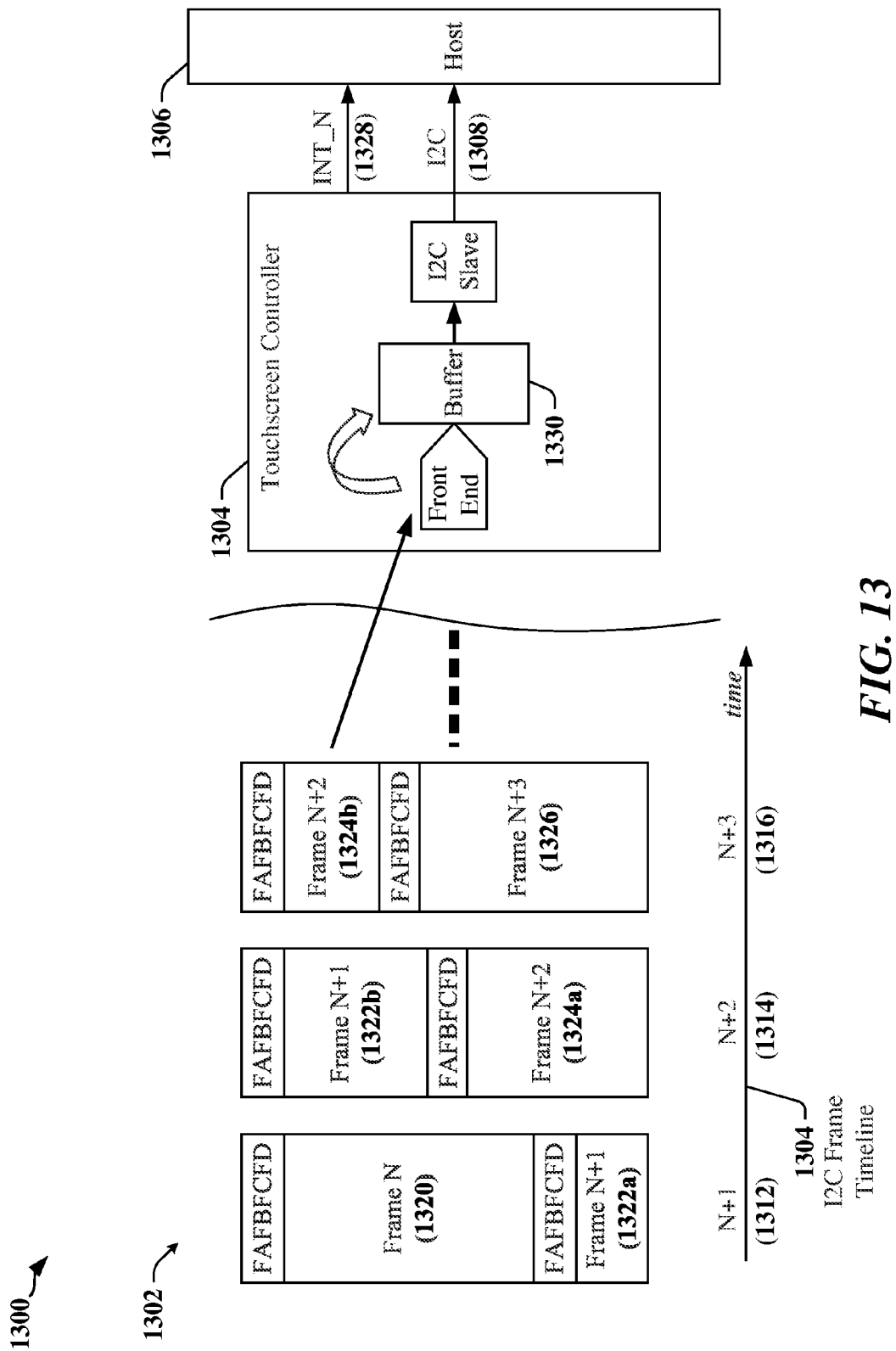
FIG. 13 illustrates payload and buffer variability according to certain aspects disclosed herein.

FIG. 13 illustrates payload and buffer variability, and sizing of I2C frames 1302 according to certain aspects disclosed herein. When compression is enabled, the size of each frame may be variable. In some instances, latencies associated with reporting frame and/or payload size may be avoided by configuring a fixed frame length for transmissions on an I2C bus 1308. Fixed length I2C frame sizes may be accomplished by filling each I2C frame 1312, 1314, 1316 with portions of one or more compressed touchscreen data frames 1320, 1322, 1324, 1326. For example, a first compressed touchscreen data frame 1320 may be transmitted in a first I2C frame 1312 with a first portion 1322a of a second compressed touchscreen data frame 1322. The remaining portion 1322b of the second compressed touchscreen data frame 1322 may be transmitted in a second. I2C frame 1314 together with a first portion 1324a of a third compressed touchscreen data frame 1324. The remaining portion 1324b of the third compressed touchscreen data frame 1322 may be transmitted in a third I2C frame 1316 together with a complete fourth compressed touchscreen data frame 1326.

The I2C bus 1308 may connect a host processor 1306 to the touchscreen controller 1304 that performs TDC. The host processor may include a bus master and may be provided in a chipset, as a system-on-chip (SOC), and/or in another type of processing circuit. In operation, the host processor 1306, or a component of the host processor 1306 may assert an interrupt signal 1328 to cause the host processor 1306 to awaken and/or to initiate reading of a buffer 1330 in the touchscreen controller 1304. The buffer 1330 may hold one or more of the compressed touchscreen data frames 1320, 1322, 1324, 1326 pending reading by the host processor 1306. The host processor 1306 may awaken and generate a clock on the SCL of the I2C bus 1308. The host processor 1306 may transmit a sequence of commands including a command to determine the size and/or quantity of I2C frames 1312, 1314, 1316 to be read. The host processor 1306 may then transmit one or more read commands to initiate transmission of the I2C frames 1312, 1314, 1316. In one example, the size of the I2C frames 1312, 1314, 1316 may correspond to the size of an uncompressed touchscreen data frame, thereby permitting configuration of the size of the I2C frames 1312, 1314, 1316 during system initialization and potentially eliminating the need for repeated communication of I2C frame 1312, 1314, 1316 size.

In some instances, the method of TDC may be adapted according to application and/or operational characteristics. The selection of TDC method may take into consideration metrics including compression ratios averaged over some period of time (e.g. one or more seconds, minutes, or other time value), touchscreen data frame rates, encoder code size, resource usage or complexity, and available buffer size. In one example, TDC leverages entropy coding including Lempel-Ziv-Markov chain algorithm (LZMA).

Figure 14:
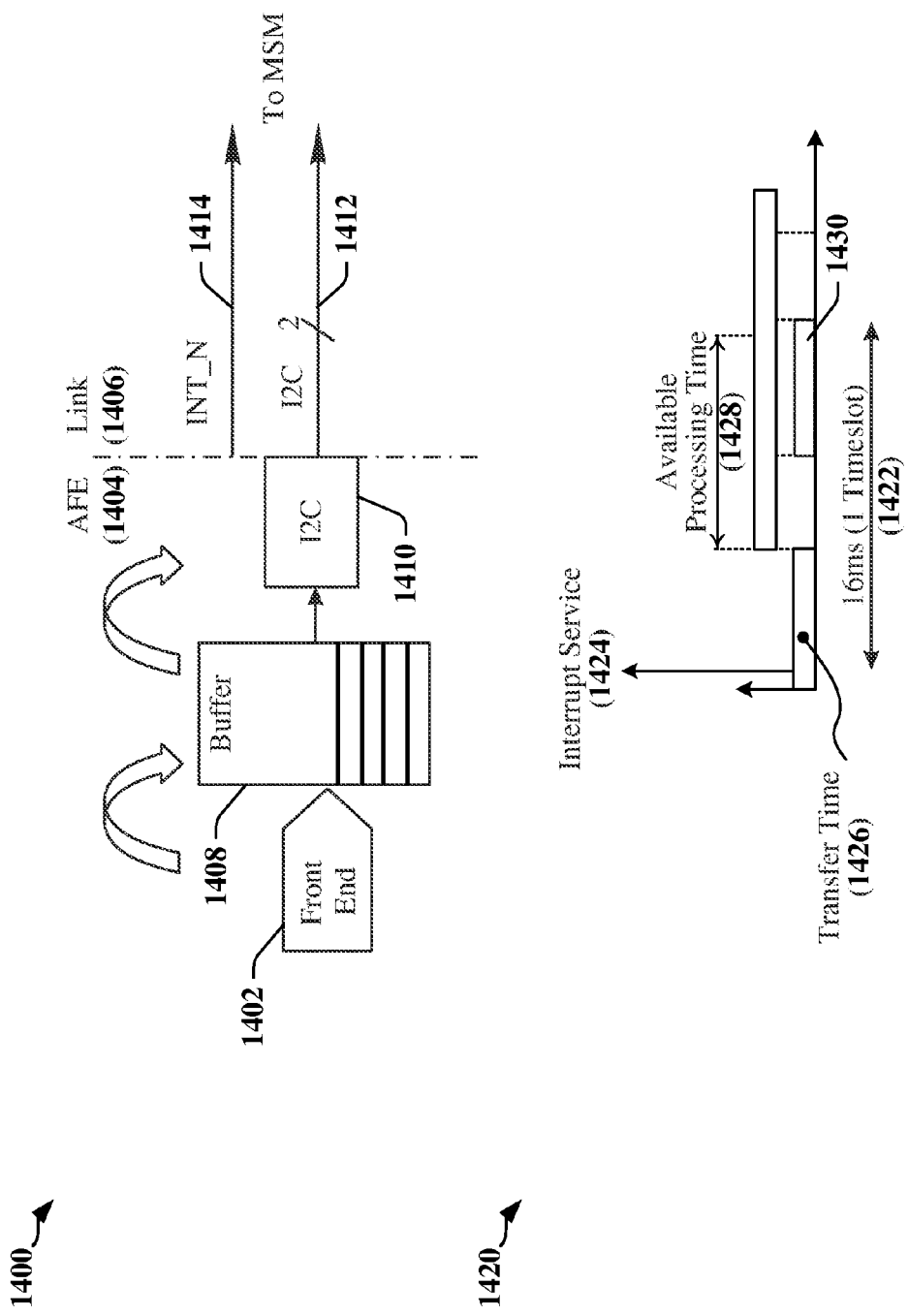
FIG. 14 illustrates timing in a system adapted to use compression in accordance with certain aspects disclosed herein.

FIG. 14 is a simplified diagram illustrating a data path 1400 and timing diagram 1420 in a system adapted to use TDC in accordance with certain aspects disclosed herein. In the illustrated data path 1400, data provided by front-end processor or circuit 1402 is buffered using a buffer 1408, queue, or other data structure and/or storage. An I2C in the analog front end (AFE) 1404 encodes data retrieved in sequence from the buffer 1408 for transmission on the communications link 1406. The communications link 1406 may include a two-wire I2C serial bus 1412 and/or one or more interrupt signals 1414. In one example, the data transmitted on the communications link 1406 may be received by a Mobile Station Modem (MSM) in a mobile communications device.

The timing diagram 1420 illustrates the division of time in a timeslot 1422 for transmitting and processing frames. In some instances, limited memory may be available to serve as touchscreen data buffer. In one example, storage may be available for two touchscreen data frames. A touchscreen controller may compress and send data within a single time slot 1422 during which a touchscreen panel may be scanned. In the example, the time slot may have a period of 16 ms, which corresponds to a 60 Hz frame rate. A first portion 1426 of the timeslot 1422 may be used for transferring data, and a second portion 1428 of the timeslot may be available for processing. By compressing the data, the transfer time period 1426 may be reduced such that the available compression time 1428 may be increased. Certain aspects disclosed herein may enable a reduction in the transfer time 1426 and a reduction in the processing period 1430, thereby permitting the device to enter a sleep mode in order to conserve power.

Figure 15:
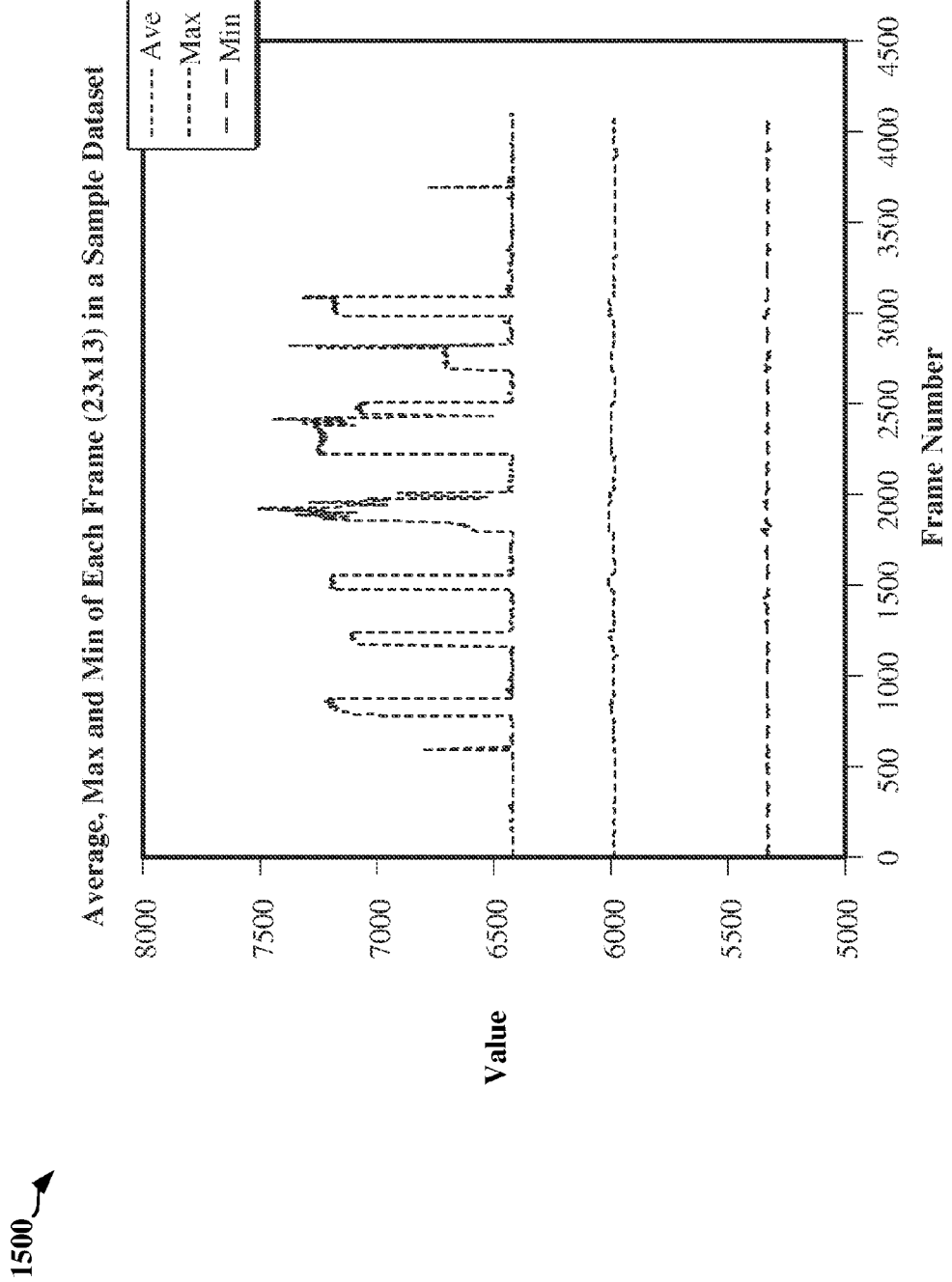
FIGS. 15-17 graphically illustrate certain aspects of touchscreen data compression implemented according to certain aspects disclosed herein.
Figure 16:
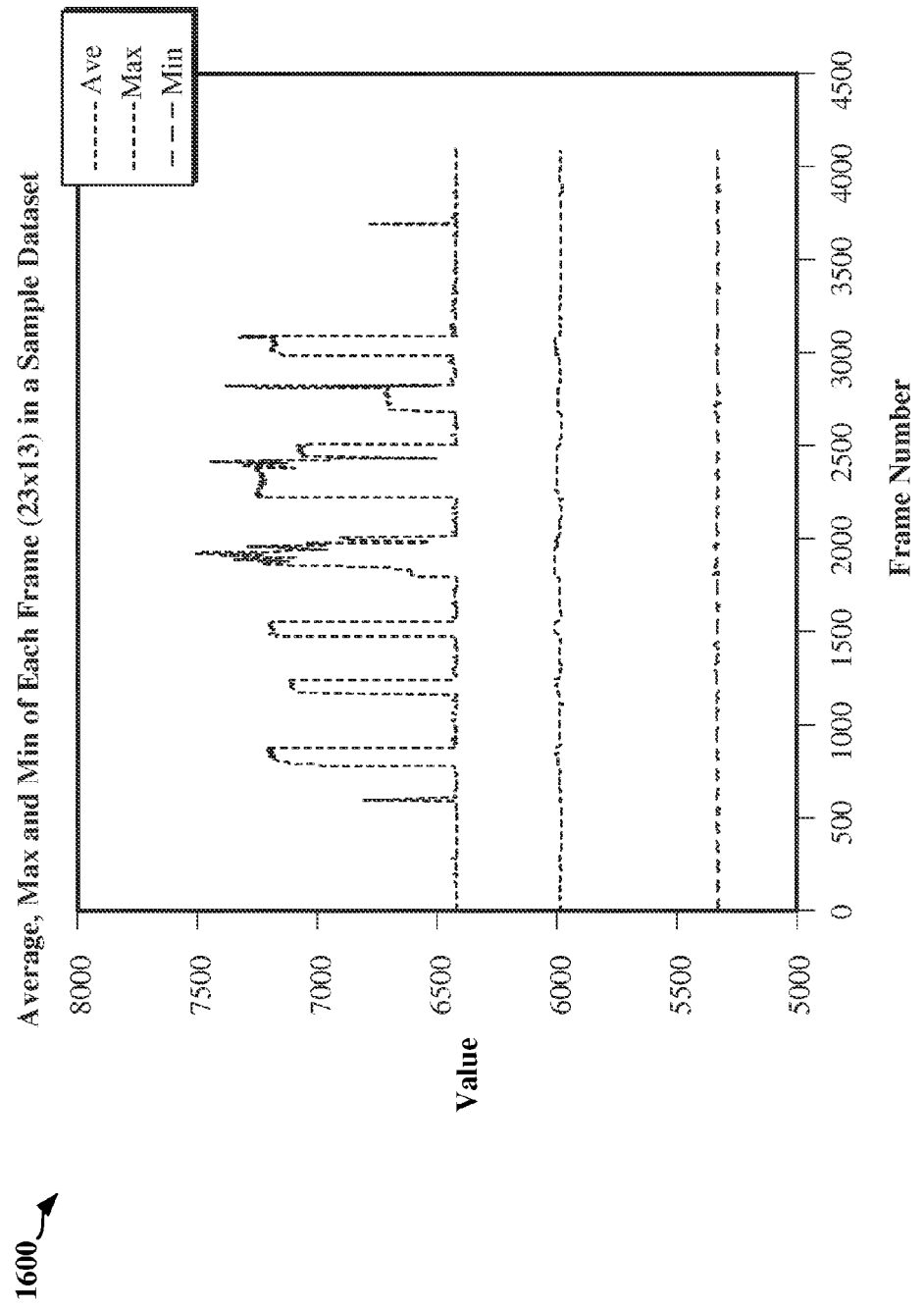
Figure 17:
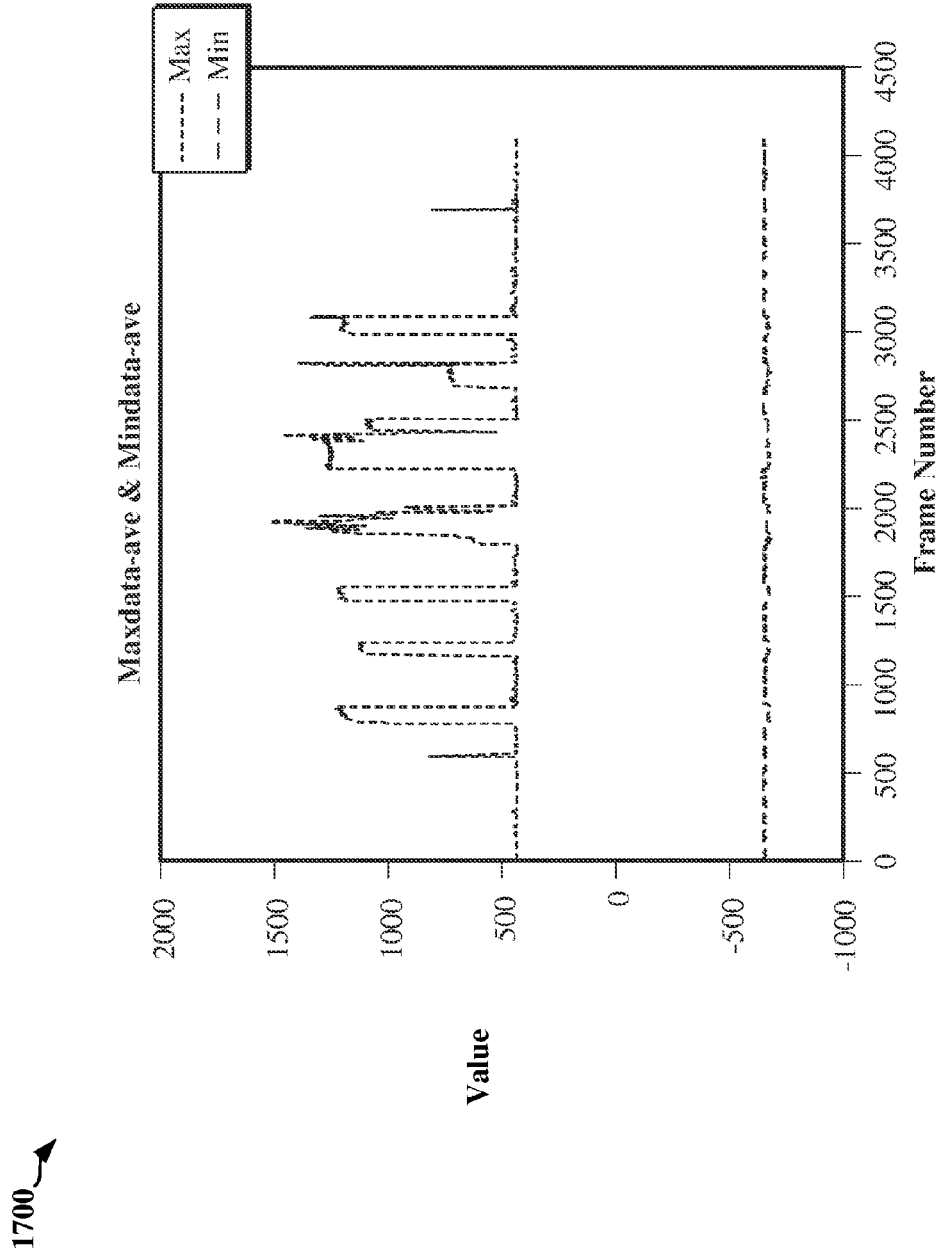

FIGS. 15-17 include graphical representations 1500, 1600, 1700 providing analysis of TDC operation and illustrating certain aspects of the performance of TDC implemented according to certain aspects disclosed herein. The examples relate to 12-bit raw representations of node values. Systems, including touchscreen controllers, may calculate an average and/or minimum difference value for each frame. In some instances, a TDC process may include subtracting an average or constant value from node data. A touchscreen controller may quantize and/or ignore sign information. In the drawings, values represent examples maximum, minimum and average value over all nodes in an example of a frame.

The TDC process may include subtracting the average constant value from the data, quantizing (which may include ignoring signed data), and runs length encoding. In one example, run length encoding may include calculating a number of consecutive '1' values, transmitting the '1' followed by the calculated number of '1' values, then calculating the number of consecutive '0' values following the '1' values, transmitting the '0' followed by the calculated number of '0' values, and so on.

Predictive Compression

Figure 18:
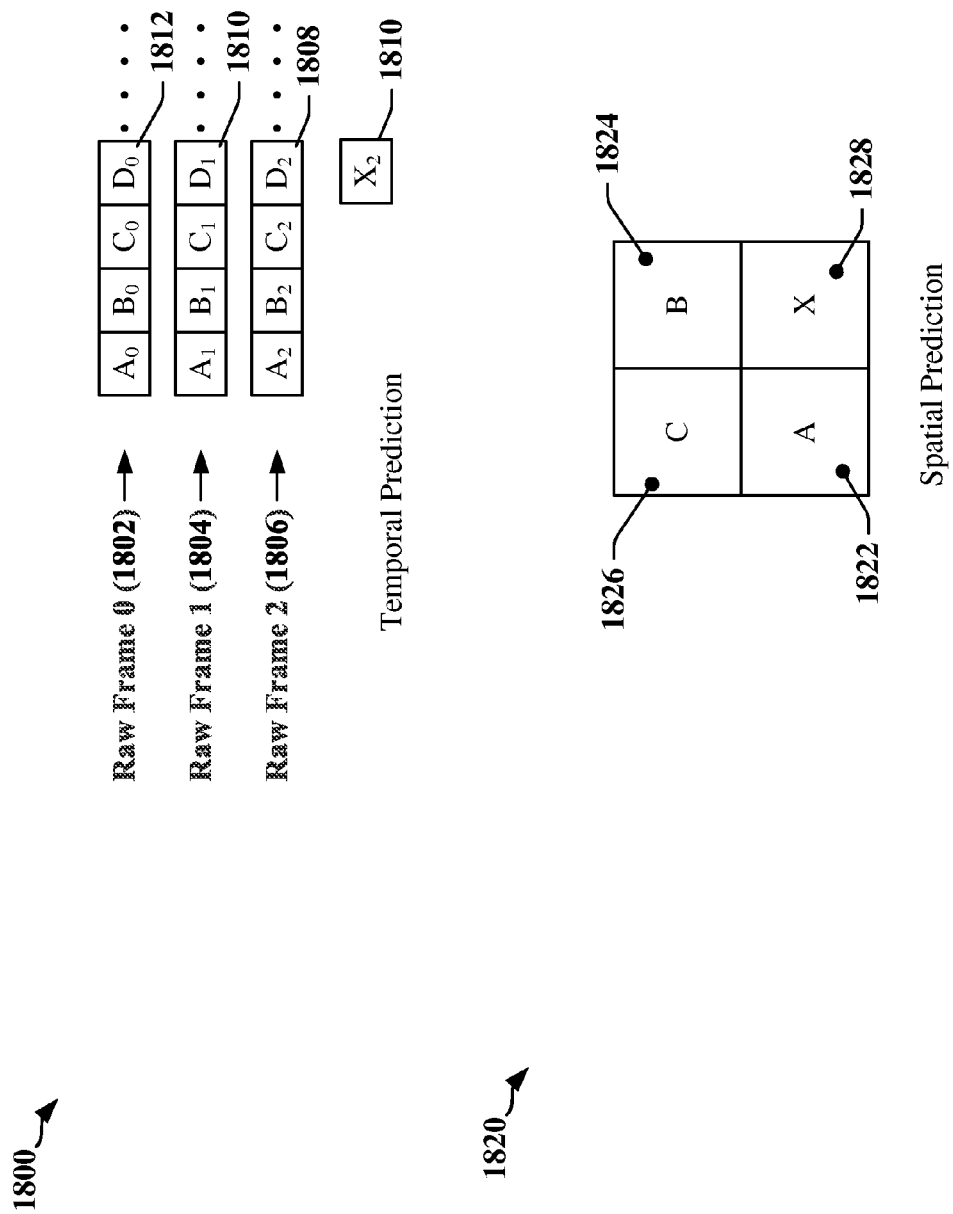
FIG. 18 illustrates certain aspects of predictive compression according to certain aspects disclosed herein.

According to certain aspects, a predictive TDC mode may be employed to compress a raw frame. With reference to FIG. 18, examples 1800, 1820 of predictive compression are illustrated. Predictive compression may employ a prediction algorithm known to a transmitter and a receiver coupled to a control data bus 208, where the transmitter may be a touchscreen controller 216 and the receiver may be a host or baseband processor 204 (see FIG. 2).

In a first example 1800, temporal predictive compression may be employed in which predictions for a current node value 1808 are obtained based on one or more prior node values 1810, and/or 1812. In the example 1820, a touchscreen controller 216 may receive a current frame 1806 for transmission after processing and/or transmitting a preceding first frame 1802 and a preceding second frame 1804. An actual node value 1808 in the received frame 1806 may be compared with a corresponding predicted node value 1810 to obtain a prediction error that may be transmitted in a corresponding location of a compressed frame. The predicted node value 1810 may be calculated using any suitable prediction algorithm. In a simple example, the predicted node value 1810 may be the average of the corresponding node values 1810, 1812 of one or more preceding frames 1804, 1802.

In a second example 1820, spatial predictive compression may be employed in which predictions for a node value 1822 are obtained based on one or more neighboring node values 1822, 1824, and/or 1828. In the example 1820, a touchscreen controller 216 may divide a current frame into a plurality of blocks of nodes. Here, the block is a 2×2 array of nodes. An actual node value (X) 1828 may be compared to a predicted node value (P) and a prediction error calculated as X-P may be transmitted in a corresponding location of a compressed frame. The predicted node value P may be calculated using any suitable prediction algorithm.

In one example, a one-dimensional spatial prediction algorithm may used where P=A, or P=B, etc. In another example, the spatial prediction algorithm may include calculating a two-dimensional average where P=(A+B+1)>>1, or more generally P=(A+B+1)/N, where N is the number of nodes included in the average. In another example, a two-dimensional spatial prediction algorithm may be based on parallelogram, where P=A+B−C. In another example, a two-dimensional spatial prediction algorithm may employ a mapping relationship where, for example, P={(min(A,B), if C≥max(A,B) @max(A,B), if C≤min (A,B) else @A+B−C}. The prediction error may be calculated as error=X−P.

The receiver may employ the same prediction algorithms to predict values for nodes in a next frame. The receiver may recover the actual frame by applying corrections based on the prediction errors transmitted as a compressed frame. For each block, prediction errors may be converted to an index (idx). For example, when $e_{i,j}$ is the prediction errors at i,j, calculate $idx_{i,j}=(le_{i,j}<<1<<1)-s$, where s={1,e↓i,j<0@0,e↓i,j≥0}.

In some instances, the error values may be transmitted as a compressed frame. The touchscreen controller 216 may determine the number of bits (MaxBits) needed to encode the absolute values of the error values. The number of bits required to represent and/or store the error values may be MaxBits and an extra sign bit. The touchscreen controller 216 may determine that the number of bits required to transmit the error codes does not result in significant or sufficient bandwidth savings that warrant transmission of the compressed touchscreen data frame, and the touchscreen controller 216 may choose to transmit the current raw touchscreen data frame.

The touchscreen controller 216 may include a header in each transmitted frame indicating whether the payload is compressed and, if so, the bit size of the compressed node values. When a raw, uncompressed touchscreen data frame is transmitted, the touchscreen controller 216 may include, in the header, information identifying whether the raw touchscreen data frame underflows, overflows of completely fills the I2C frame.

In some instances, a touchscreen data frame that is compressed using spatial prediction may be transmitted in a bitstream with the raw first node value. Accordingly, the prediction error for the first node in the frame can be expected to be 0, because the prediction commences with the actual value of the first node.

Figure 19:
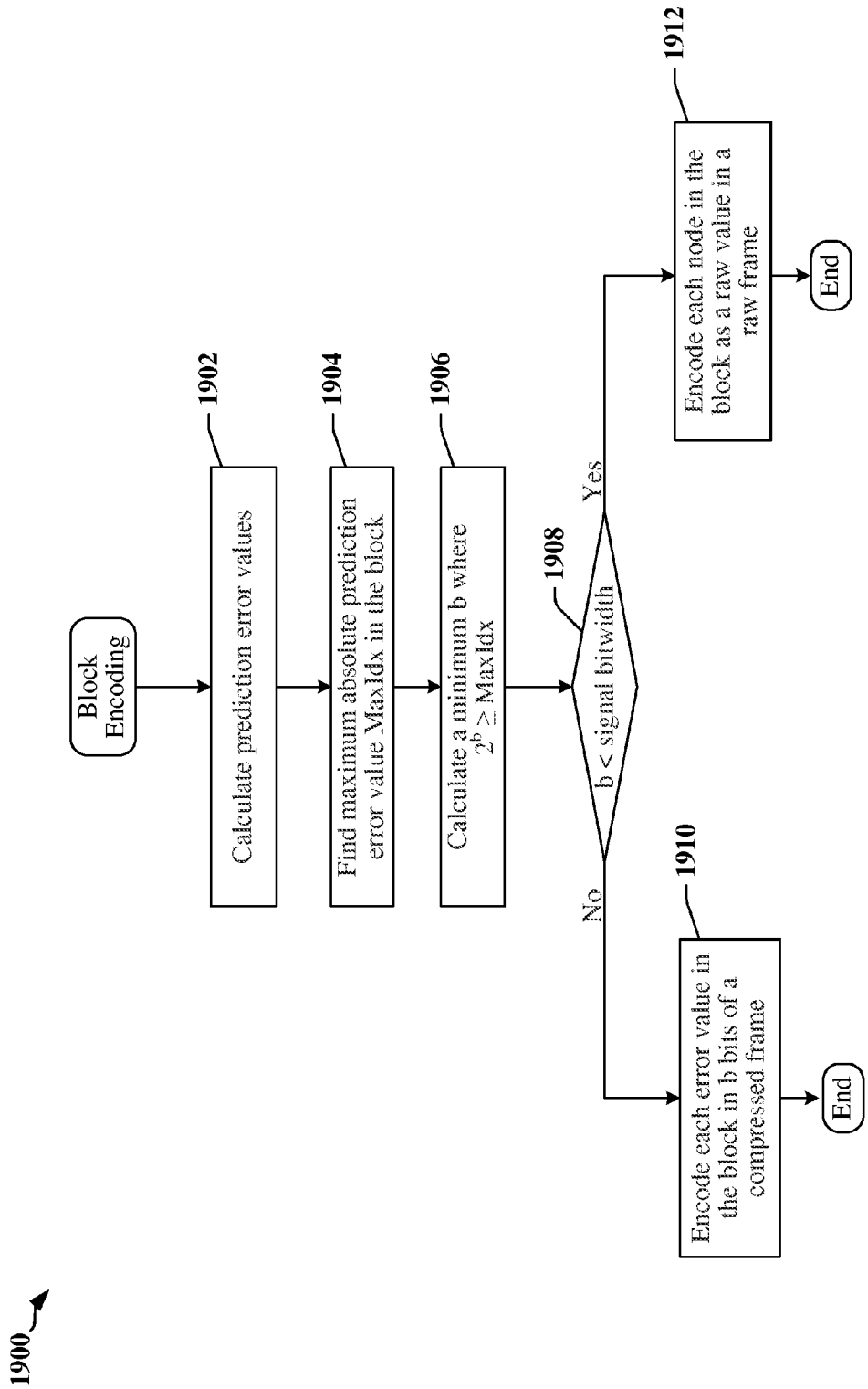
FIG. 19 is a flowchart illustrating spatial predictive compression of a block of nodes in accordance with certain aspects disclosed herein.

FIG. 19 is a flowchart illustrating spatial predictive compression used for processing a block of nodes according to certain aspects disclosed herein. The encoding may be performed by a touchscreen controller 216. The touchscreen controller 216 may receive or identify a block of nodes to be processed. At block 1902, the touchscreen controller 216 may calculate a plurality of prediction errors for the nodes. The touchscreen controller 216 may predict the value of each node in the block based on a spatial predictive algorithm. The touchscreen controller 216 may then calculate the prediction error as a difference in the predicted value and the actual value of the node.

At block 1904, the touchscreen controller 216 may find the maximum absolute prediction error value for the block.

At block 1906, the touchscreen controller 216 may calculate the number of binary bits (b) required to represent the maximum absolute prediction error value for the block.

At block 1908, the touchscreen controller 216 may determine if the value of b is less than the number of bits required to encode raw node values in the block. If the value of b is less than the number of bits required for encoding raw node values, then the touchscreen controller 216 may provide the error values in a compressed touchscreen data frame or portion of a frame at block 1910. If the value of b is not less than the number of bits required for encoding raw node values, then the touchscreen controller 216 may provide the raw node values in a raw touchscreen data frame, or portion of a frame at block 1912.

Packing bits in a column/row may result in data that is terminated at non-byte boundaries. In some instances, packing may continue at a non-byte boundary for a subsequent column/row (continuous packing). In other instances, each column/row may be padded to achieve 2 byte boundaries or 4 byte boundaries, for example. In other instances, compression rates (e.g. 50%, 75% of uncompressed size) may be controlled such that certain rates that guarantee proper boundaries are permitted.

Various examples disclosed herein relate to compression of touchscreen data. The techniques, apparatus, methods and algorithms described may also be used to compress other types of information. For example, certain aspects may be applied to biometric sensors, including fingerprint sensors, iris scanners, thermal imagers and other sensors. Certain aspects disclosed herein may be applied to compression of raw data produced by an image sensor, including charge coupled device (CCD) sensors employed in cameras and infrared imaging systems.

Figure 20:
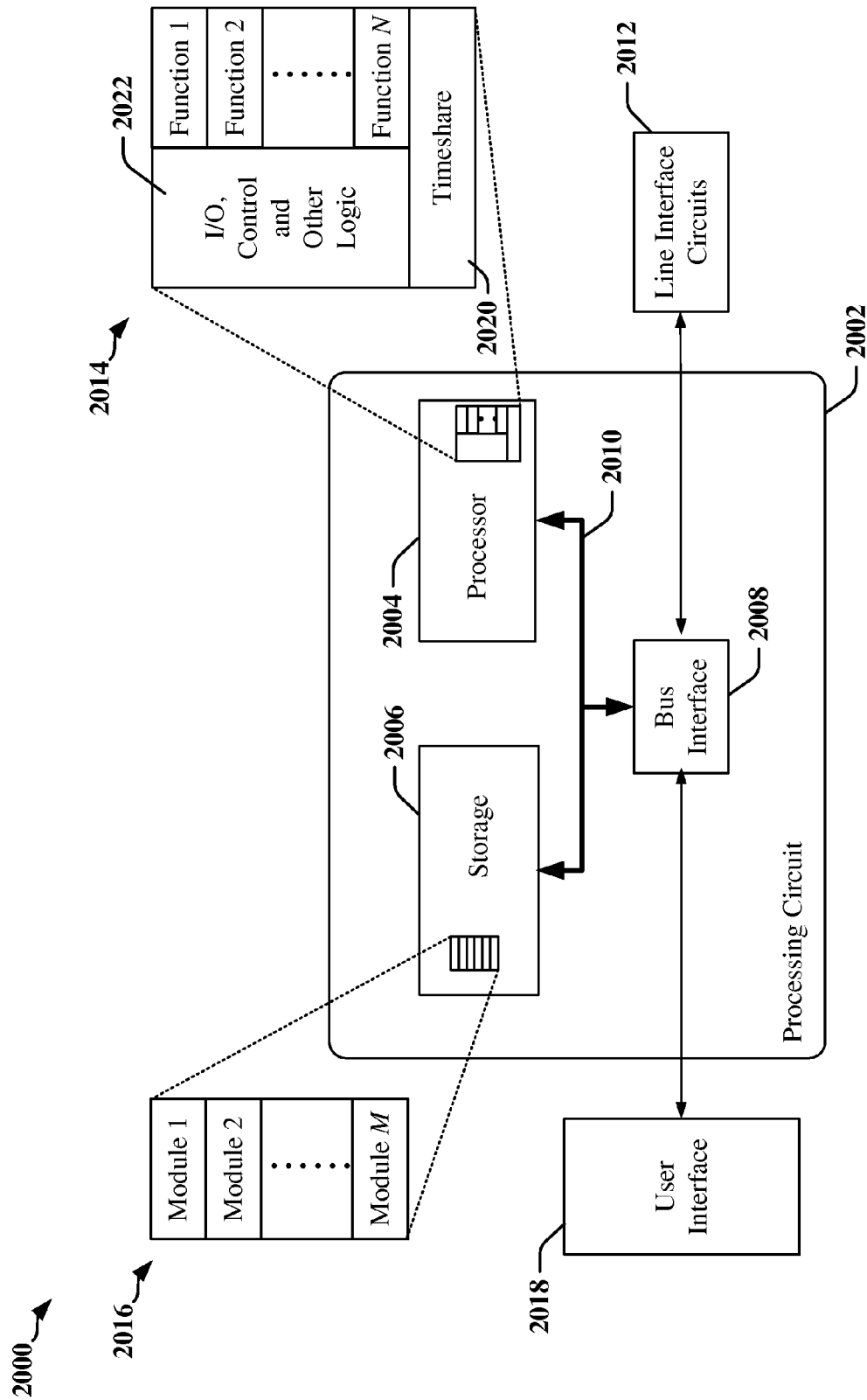
FIG. 20 is a block diagram illustrating an example of an apparatus employing a processing circuit that may be adapted according to certain aspects disclosed herein.

FIG. 20 is a conceptual diagram 2000 illustrating a simplified example of a hardware implementation for an apparatus employing a processing circuit 2002 that may be configured to perform one or more functions disclosed herein. For example, the processing circuit may be deployed as the processing circuit 102 of FIG. 1, at least a portion of the device 202 of FIG. 2, and/or one or more of the devices 302, 324 of FIG. 3, for example. In accordance with various aspects of the disclosure, an element, or any portion of an element, or any combination of elements as disclosed herein may be implemented using the processing circuit 2002. The processing circuit 2002 may include one or more processors 2004 that are controlled by some combination of hardware and software modules. Examples of processors 2004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012. A transceiver 2012 may be provided for each networking technology supported by the processing circuit. In some instances, multiple networking technologies may share some or all of the circuitry or processing modules found in a transceiver 2012. Each transceiver 2012 provides a means for communicating with various other apparatus over a transmission medium. Depending upon the nature of the apparatus, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by, the processor 2004 when executing software, and the software may be configured to implement any one of the methods disclosed herein.

The storage 2006 may include secure and/or encrypted memory, or unsecure and/or unencrypted memory, or any combination thereof.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002.

The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a nm-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as the transceiver 2012, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to the transceiver 2012, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

The processing circuit 2002 may be provided in a mobile computing device that includes a touchscreen display and touchscreen controller 216 (see FIG. 2). The touchscreen display may include a resistive-sensing touchscreen, capacitive-sensing touchscreen, an infrared sensing touchscreen, and so on. The mobile computing device may have one or more long-range and/or short-range radio signal transceivers configured or adapted to support protocols such as Peanut, Bluetooth®, Zigbee®, and antennas for sending and receiving wireless signals. The transceivers and antennas may be used with the above-mentioned circuitry to implement various wireless transmission protocol stacks/interfaces. The mobile computing device may include a cellular network wireless modem chip that enables communication via a cellular network.

Figure 21:
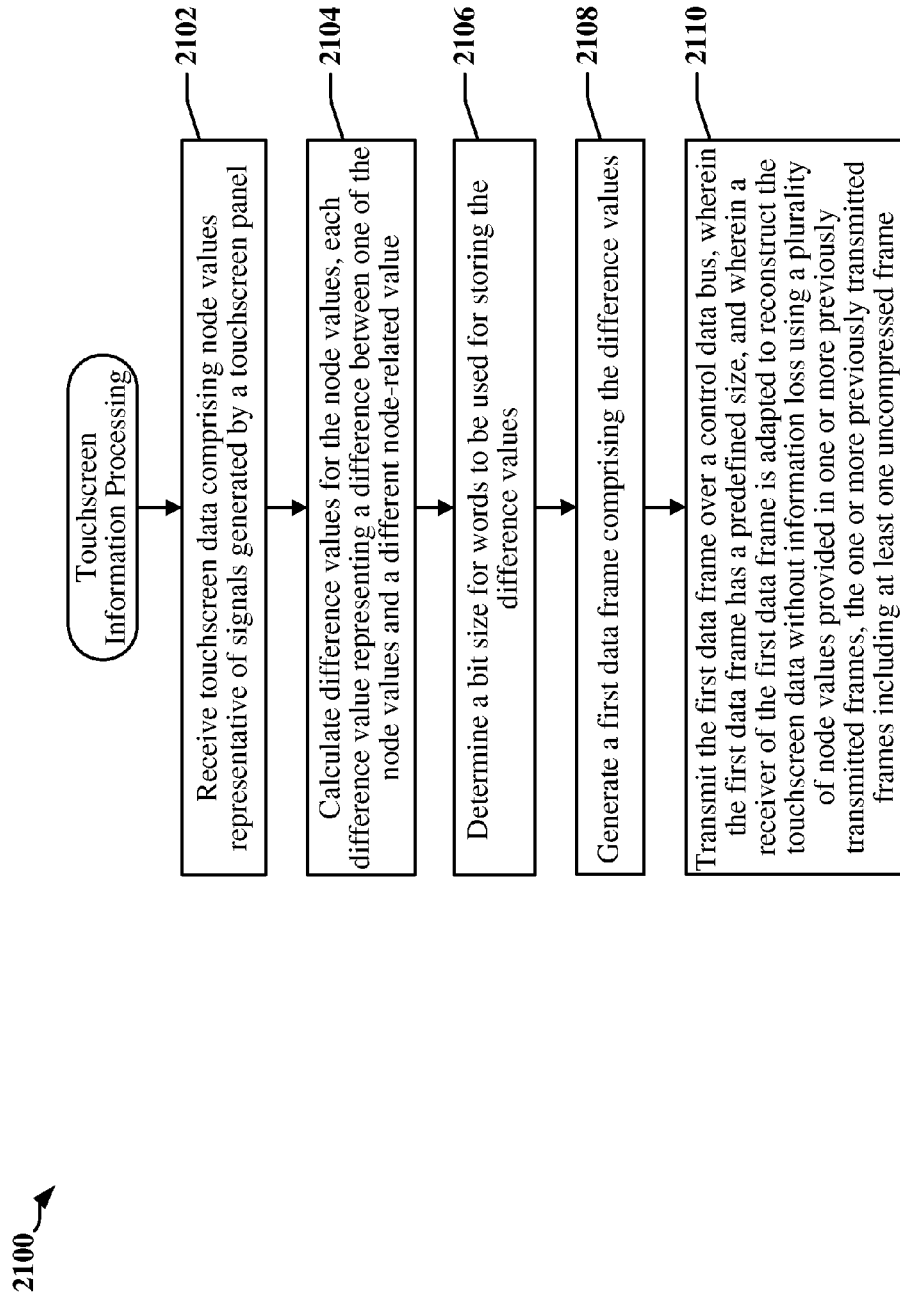
FIG. 21 is a flow chart of a method of touchscreen information processing according to certain aspects disclosed herein.

FIG. 21 is a flow chart 2100 of a method of processing touchscreen information. The method may be performed by a touchscreen controller 216. At block 2102, the touchscreen controller 216 may receive touchscreen data that includes node values representative of signals generated by a touchscreen panel.

At block 2102, the touchscreen controller 216 may calculate difference values for the node values. Each of the difference values may be calculated as a difference between one of the node values and a different node-related value.

At block 2104, the touchscreen controller 216 may determine a bit size for words to be used for storing the difference values.

At block 2108, the touchscreen controller 216 may generate a first data frame that includes the difference values. In one example, the first data frame has a predefined size. In another example, the first data frame has a size determined by the bit size of the words to store the difference values.

At block 2110, the touchscreen controller 216 may transmit the first data frame over a control data bus. The first data frame may have a predefined size. The first data frame may have a size fixed for all frames carrying touchscreen data. A receiver of the first data frame may be adapted to reconstruct the touchscreen data without information loss using a plurality of node values provided in one or more previously transmitted frames. The one or more previously transmitted frames may include at least one uncompressed frame.

In one example, the touchscreen controller 216 may organize the node values as a plurality of rows corresponding to physical rows of sensors on the touchscreen panel, and independently calculate a set of difference values for each row. Calculating a set of difference values for each row may include designating a first node in the each row as a reference node, determining a first difference value as a mathematical difference between the reference node and a second first node in the each row, the first node and the second node corresponding to physically adjacent sensors on the touchscreen panel, and determining a second difference value as a mathematical difference between the second node and a third node in the each row, the second node and the third node corresponding to physically adjacent sensors on the touchscreen panel.

In another example, the touchscreen controller 216 may organize the node values as a plurality of columns corresponding to physical columns of sensors on the touchscreen panel, independently calculate a set of difference values for each column, designate a first node in the each column as a reference node, determine a first difference value as a mathematical difference between the reference node and a second first node in the each column, the first node and the second node corresponding to physically adjacent sensors on the touchscreen panel, and determine a second difference value as a mathematical difference between the second node and a third node in the each column, the second node and the third node corresponding to physically adjacent sensors on the touchscreen panel.

In another example, the different node-related value corresponds to at least one sensor on the touchscreen panel that is physically adjacent to a sensor corresponding to the one node.

In another example, the touchscreen controller 216 may organize the node values in a plurality of blocks corresponding to blocks of physically proximate sensors on the touchscreen panel and calculate a set of difference values for each of the plurality of blocks. A different node-related value may be defined for each of the plurality of blocks.

In another example, the touchscreen controller 216 may generate the first data frame by determining a maximum difference value in a plurality of the difference values, calculating a number of bits needed to encode the maximum difference value, and generating a payload by encoding each difference value using the number of bits needed to encode the maximum difference value. The touchscreen controller 216 may pack a plurality of data elements in the payload, and add a header to the payload to obtain the first data frame. The header may identify a number of bits needed to encode the maximum difference value. The touchscreen controller 216 may provide at least a portion of the payload in a second data frame that carries a different payload. The first data frame and the second data frame may be equal in size.

In another example, the touchscreen controller 216 may generate the first data frame by generating a predicted value for a first node, and generating one of the difference values based on a difference calculated between the predicted value for the first node and one of the node values in the touchscreen data that corresponds to the first node. Generating the predicted value for the first node may include using a spatial predictive algorithm. Generating the predicted value for the first node may include using a temporal predictive algorithm.

Figure 22:
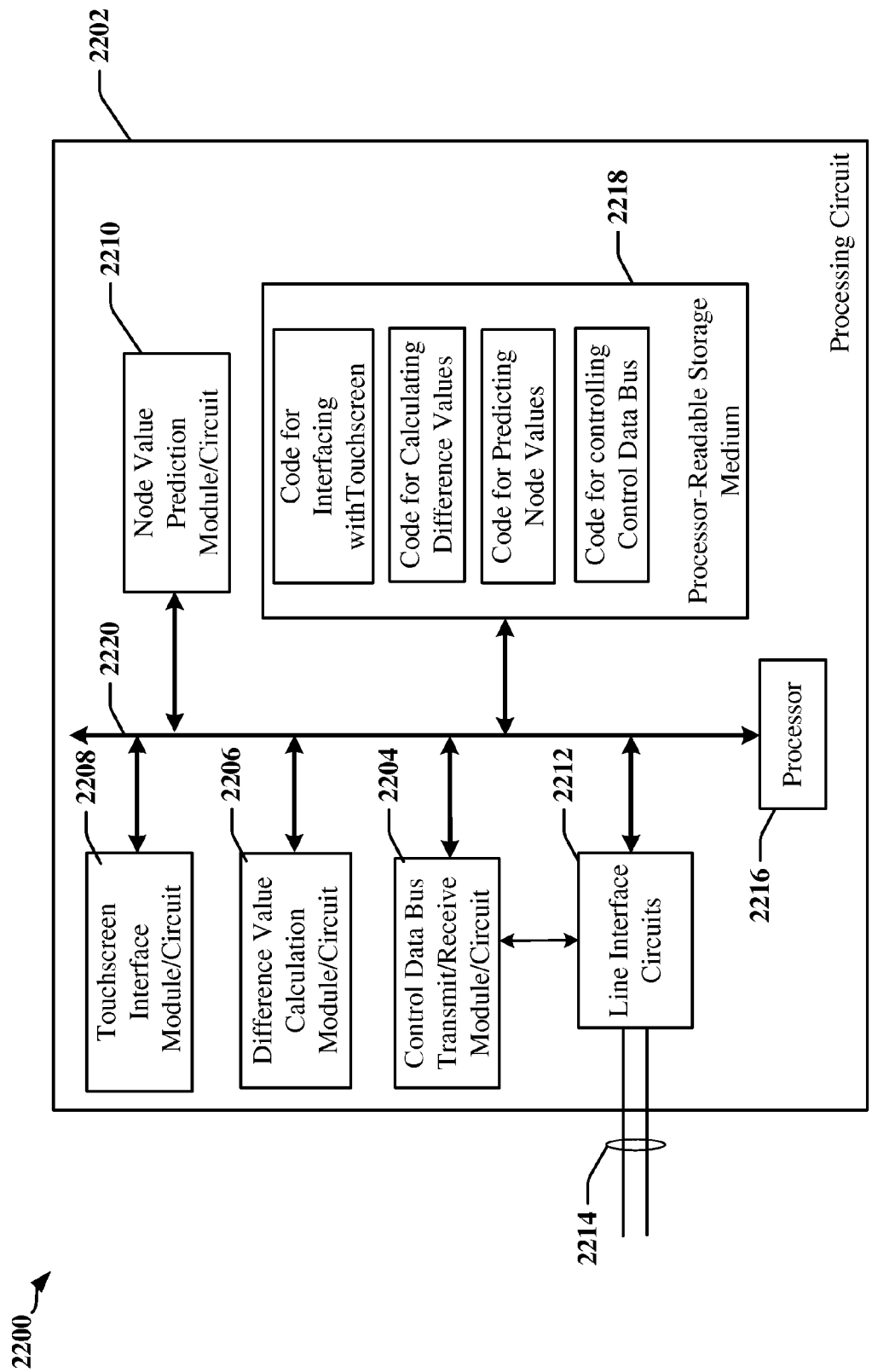
FIG. 22 is a diagram illustrating a first example of a hardware implementation for an apparatus employing a processing circuit adapted according to certain aspects disclosed herein.

FIG. 22 is a diagram illustrating a simplified example of a hardware implementation for an apparatus 2200 employing a processing circuit 2202. The processing circuit typically has a processor 2216 that may include one or more of a microprocessor, microcontroller, digital signal processor, a sequencer and a state machine. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the processor 2216, the modules or circuits 2204, 2206, 2208, and 2210, line interface circuits 2212 configurable to communicate over connectors or wires 2214 and the computer-readable storage medium 2218. The bus 2220 may also link various other circuits such as timing sources, peripherals, voltage regulators, and power management circuits, which are well known in the art, and therefore, will not be described any further.

The processor 2216 is responsible for general processing, including the execution of software stored on the computer-readable storage medium 2218. The software, when executed by the processor 2216, causes the processing circuit 2202 to perform the various functions described supra for any particular apparatus. The computer-readable storage medium 2218 may also be used for storing data that is manipulated by the processor 2216 when executing software, including data decoded from symbols transmitted over the connectors 2214, which may be configured as data lanes and clock lanes. The processing circuit 2202 further includes at least one of the modules 2204, 2206, 2208, and 2210. The modules 2204, 2206, 2208, and 2210 may be software modules running in the processor 2216, resident/stored in the computer-readable storage medium 2218, one or more hardware modules coupled to the processor 2216, or some combination thereof. The modules 2204, 2206 and/or 2208 may include microcontroller instructions, state machine configuration parameters, or some combination thereof.

In one configuration, the apparatus 2200 for wireless communication includes a module and/or circuit 2204 that is configured to transmit, receive and/or control operations related to a control data bus 2214, a module and/or circuit 2206 configured to calculate difference values in touchscreen data, a module and/or circuit 2208 configured to interface and communicate with a touchscreen panel, and a module and/or circuit 2210 configured to calculate or predict values expected for one or more nodes in touchscreen data.

Figure 23:
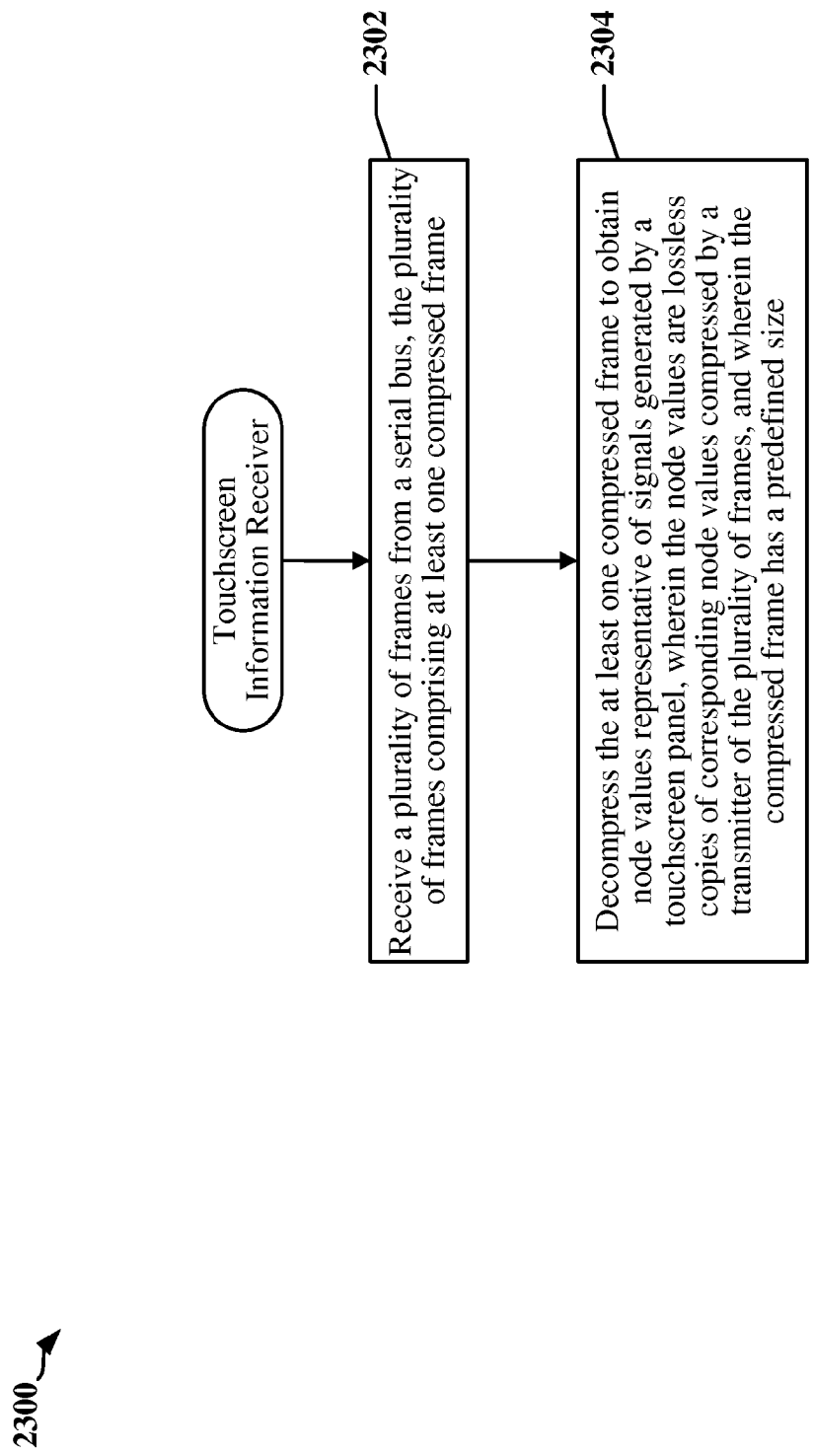
FIG. 23 is a flow chart of a method of reconstructing touchscreen information received in compressed frames according to certain aspects disclosed herein.

FIG. 23 is a flow chart 2300 of a method of processing touchscreen information. The method may be performed by device coupled to a touchscreen controller 216 through a serial bus. At block 2302, a plurality of frames may be received from a serial bus. The plurality of frames may include at least one compressed frame.

At block 2304, the compressed frame may be decompressed to obtain node values representative of signals generated by a touchscreen panel. The node values may be lossless copies of corresponding node values compressed by a transmitter of the plurality of frames. The compressed frame may have a predefined size. Each node value may correspond to a state of a sensor on the touchscreen panel.

In one example, the at least one compressed frame includes difference values. Each of the difference values may represent a difference between one of the node values and a corresponding node value in a previously received frame.

In another example, the at least one compressed frame includes difference values. Each of the difference values may represent a difference between one of the node values and one or more other values in the at least one compressed frame.

In another example, the at least one compressed frame includes difference values, and decompressing the at least one compressed frame may include generating a predicted value for a first node using a predetermined prediction algorithm, and adjusting the predicted value by a first difference value provided in the at least one compressed frame. The first difference value may correspond to the first node. Difference values in the at least one compressed frame may be calculated by the transmitter of the plurality of frames using a prediction algorithm the predetermined prediction algorithm.

In another example, the plurality of frames includes one or more uncompressed frames and it may be determined whether each frame in the plurality of frames is compressed based on a header of the each frame.

In another example, a plurality of data elements may be unpacked from each frame in the plurality of frames to obtain sets of data elements corresponding to rows or columns of the touchscreen panel.

Figure 24:
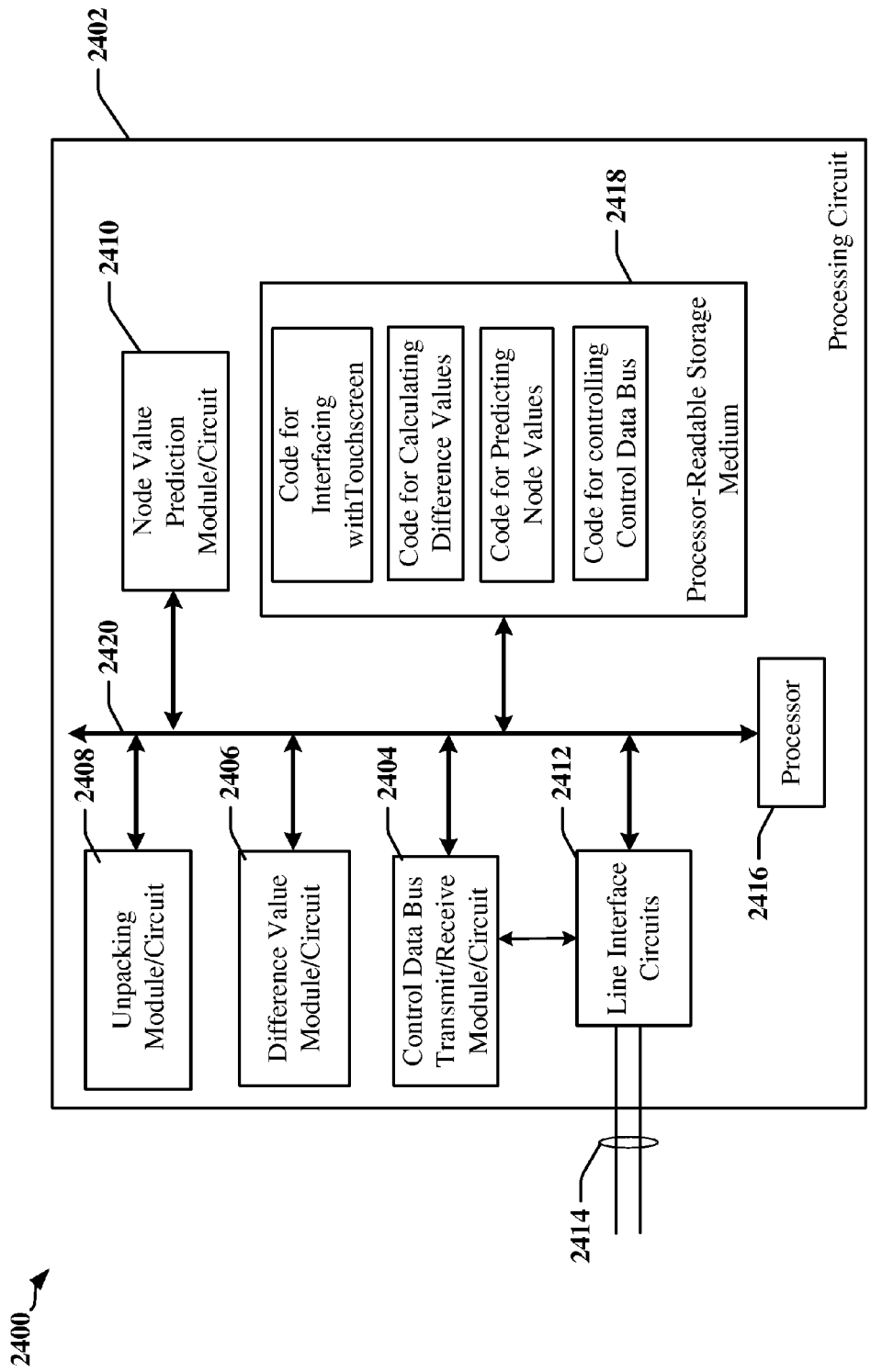
FIG. 24 is a diagram illustrating a second example of a hardware implementation for an apparatus employing a processing circuit adapted according to certain aspects disclosed herein.

FIG. 24 is a diagram illustrating a simplified example of a hardware implementation for an apparatus 2400 employing a processing circuit 2402. The processing circuit typically has a processor 2416 that may include one or more of a microprocessor, microcontroller, digital signal processor, a sequencer and a state machine. The processing circuit 2402 may be implemented with a bus architecture, represented generally by the bus 2420. The bus 2420 may include any number of interconnecting buses and bridges depending on the specific application of the processing circuit 2402 and the overall design constraints. The bus 2420 links together various circuits including one or more processors and/or hardware modules, represented by the processor 2416, the modules or circuits 2404, 2406, 2408, and 2410, line interface circuits 2412 configurable to communicate over connectors or wires 2414 and the computer-readable storage medium 2418. The bus 2420 may also link various other circuits such as timing sources, peripherals, voltage regulators, and power management circuits, which are well known in the art, and therefore, will not be described any further.

The processor 2416 is responsible for general processing, including the execution of software stored on the computer-readable storage medium 2418. The software, when executed by the processor 2416, causes the processing circuit 2402 to perform the various functions described supra for any particular apparatus. The computer-readable storage medium 2418 may also be used for storing data that is manipulated by the processor 2416 when executing software, including data decoded from symbols transmitted over the connectors 2414, which may be configured as data lanes and clock lanes. The processing circuit 2402 further includes at least one of the modules 2404, 2406, 2408, and 2410. The modules 2404, 2406, 2408, and 2410 may be software modules running in the processor 2416, resident/stored in the computer-readable storage medium 2418, one or more hardware modules coupled to the processor 2416, or some combination thereof. The modules 2404, 2406 and/or 2408 may include microcontroller instructions, state machine configuration parameters, or some combination thereof.

In one configuration, the apparatus 2400 for wireless communication includes a module and/or circuit 2404 that is configured to transmit, receive, and/or control operations related to a control data bus 2414, a module and/or circuit 2406 configured to employ difference values in compressed data frames to provide uncompressed frames, a module and/or circuit 2408 configured to unpack data frames received from the control data bus 2414, and a module and/or circuit 2410 configured to calculate or predict values expected for one or more nodes in touchscreen data.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for processing touchscreen information, comprising:
   receiving first touchscreen data comprising node values representative of touch inputs detected by a plurality of touch sensors of a touchscreen panel;
   calculating difference values for the node values, each difference value representing a difference between one of the node values and a reference node value, wherein the difference values are independently calculated for each row of a plurality of rows when the node values are organized as a plurality of rows corresponding to physical rows of sensors on the touchscreen panel, and the difference values are independently calculated for each column of a plurality of columns when the node values are organized as a plurality of columns corresponding to physical columns of sensors on the touchscreen panel;
   determining a maximum difference value in the difference values;
   determining a minimum number of bits needed to encode the maximum difference value;
   generating a first data frame, wherein the first data frame comprises difference values when the minimum number of bits does not exceed a threshold number of bits, and wherein the first data frame comprises node values when the minimum number of bits exceeds the threshold number of bits; and transmitting the first data frame over a control data bus, wherein the first data frame has a fixed size.

2. A method for processing touchscreen information, comprising:

receiving first touchscreen data comprising node values representative of touch inputs detected by a plurality of touch sensors of a touchscreen panel;

calculating difference values for the node values, each difference value representing a difference between one of the node values and a reference node value;

determining a maximum difference value in the difference values;

determining a minimum number of bits needed to encode the maximum difference value;

generating a first data frame, wherein the first data frame comprises difference values when the minimum number of bits does not exceed a threshold number of bits, and wherein the first data frame comprises node values when the minimum number of bits exceeds the threshold number of bits;

transmitting the first data frame over a control data bus, wherein the first data frame has a fixed size; and transmitting a raw data frame comprising reference node values representative of touch inputs received in previously-received second touchscreen data, wherein the first touchscreen data can be reconstructed from the first data frame and the raw data frame when the first data frame comprises the difference values.

3. The method of claim 1, wherein the node values are organized as a plurality of rows, and further comprising:

independently calculating a set of difference values for each row, wherein calculating a set of difference values for each row comprises:

designating a first node in the each row as a reference node;

determining a first difference value as a mathematical difference between the reference node and a second node in the each row, the first node and the second node corresponding to physically adjacent sensors on the touchscreen panel;

determining a second difference value as a mathematical difference between the second node and a third node in the each row, the second node and the third node corresponding to physically adjacent sensors on the touchscreen panel; and determining the maximum difference value from maximum difference values determined for each set of difference values.

4. The method of claim 1, wherein the node values are organized as a plurality of columns, and further comprising:

independently calculating a set of difference values for each column, wherein calculating a set of difference values for each column comprises:

designating a first node in the each column as a reference node;

determining a first difference value as a mathematical difference between the reference node and a second first node in the each column, the first node and the second node corresponding to physically adjacent sensors on the touchscreen panel;

determining a second difference value as a mathematical difference between the second node and a third node in the each column, the second node and the third node corresponding to physically adjacent sensors on the touchscreen panel; and determining the maximum difference value using the maximum difference value determined for each set of difference values.

5. The method of claim 1, wherein the reference node value corresponds to at least one sensor on the touchscreen panel that is physically adjacent to a sensor corresponding to the one of the node values.

6. A method for processing touchscreen information, comprising:

receiving first touchscreen data comprising node values representative of touch inputs detected by a plurality of touch sensors of a touchscreen panel;

calculating difference values for the node values, each difference value representing a difference between one of the node values and a reference node value;

determining a maximum difference value in the difference values;

determining a minimum number of bits needed to encode the maximum difference value;

generating a first data frame, wherein the first data frame comprises difference values when the minimum number of bits does not exceed a threshold number of bits, and wherein the first data frame comprises node values when the minimum number of bits exceeds the threshold number of bits; and transmitting the first data frame over a control data bus, wherein the first data frame has a fixed size, wherein calculating the difference values for the node values includes:

organizing the node values in a plurality of blocks corresponding to blocks of physically proximate sensors on the touchscreen panel; and calculating a set of difference values for each of the plurality of blocks, wherein a reference node value is defined for each of the plurality of blocks.

7. The method of claim 1, wherein generating the first data frame comprises:

generating a payload by encoding each difference value using the number of bits needed to encode the maximum difference value, when the minimum number of bits does not exceed the threshold number of bits.

8. The method of claim 7, further comprising:

packing a plurality of data elements in the payload; and adding a header to the payload to obtain the first data frame, wherein the header identifies a number of bits needed to encode the maximum difference value.

9. The method of claim 7, further comprising:

providing at least a portion of the payload in a second data frame that carries a different payload, wherein the first data frame and the second data frame are equal in size.

10. The method of claim 1, wherein generating the first data frame comprises:

generating a predicted value for a first node; and generating one of the difference values based on a difference calculated between the predicted value for the first node and one of the node values in the first touchscreen data that corresponds to the first node.

11. The method of claim 10, wherein generating the predicted value for the first node comprises:

using a spatial predictive algorithm.

12. The method of claim 10, wherein generating the predicted value for the first node comprises:
using a temporal predictive algorithm.

13. A touchscreen interface, comprising:
a communications interface adapted to communicate data over a serial bus; and
a touchscreen controller configured to:
receive first touchscreen data comprising node values representative of touch inputs detected by a plurality of touch sensors of a touchscreen panel;
calculate difference values for the node values, each difference value representing a difference between one of the node values and a reference node value;
determining a maximum difference value in the difference values;
determine a minimum number of bits needed to encode the maximum difference value;
generate a first data frame, wherein the first data frame comprises difference values when the minimum number of bits does not exceed a threshold number of bits, and wherein the first data frame comprises node values when the minimum number of bits exceeds the threshold number of bits; and
transmit the first data frame over a control data bus,
wherein in one mode of operation, the touchscreen controller is configured to calculate the difference values based on difference between each set of nodes and a corresponding set of nodes in a preceding data frame.

14. The touchscreen interface of claim 13, wherein the touchscreen controller is configured to:
organize the node values into sets of node values in correspondence with a physical layout of sensors on the touchscreen panel;
independently calculate difference values for each set of node values; and
determine the maximum difference value from maximum difference values determined for each set of node values.

15. The touchscreen interface of claim 14, wherein the touchscreen controller is configured to:
calculate the difference values based on difference between node values within each set of nodes.

16. A method for processing touchscreen information, comprising:
receiving a plurality of frames from a serial bus, the plurality of frames comprising at least one compressed frame; and
decompressing the at least one compressed frame to obtain node values representative of signals generated by a touchscreen panel, wherein decompressing the at least one compressed frame includes:
reconstructing a plurality of the node values from reference node values and corresponding difference values in the at least one compressed frame,
wherein the node values are lossless copies of corresponding node values compressed by a transmitter of the plurality of frames, and
wherein the compressed frame has a predefined size and the difference values are encoded in a number of bits determined by a maximum difference value in the at least one compressed frame, and
wherein in a first mode of operation, each of the difference values in the at least one compressed frame represents a difference between one of the node values and a corresponding node value in a previously received frame.

17. The method of claim 16, wherein each of the difference values in the at least one compressed frame represents a difference between one of the node values and one or more other values in the at least one compressed frame.

18. The method of claim 16, wherein decompressing the at least one compressed frame comprises:
generating a predicted value for a first node using a predetermined prediction algorithm; and
adjusting the predicted value by a first difference value provided in the at least one compressed frame, wherein the first difference value corresponds to the first node,
wherein difference values in the at least one compressed frame are calculated by the transmitter of the plurality of frames using a prediction algorithm the predetermined prediction algorithm.

19. The method of claim 16, wherein the plurality of frames comprises one or more uncompressed frames, and further comprising:
determining whether each frame in the plurality of frames is compressed based on a header of the each frame.

20. The method of claim 16, wherein each node value corresponds to a state of a sensor on the touchscreen panel.

21. The method of claim 16, further comprising:
for each frame received in a second mode of operation, unpacking a plurality of data elements received in the each frame to obtain sets of data elements corresponding to rows or columns of the touchscreen panel.

22. An apparatus comprising:
means for receiving a plurality of frames from a serial bus, the plurality of frames comprising at least one compressed frame; and
means for decompressing the at least one compressed frame to obtain node values representative of signals generated by a touchscreen panel, wherein the means for decompressing the at least one compressed frame is configured to:
reconstruct a plurality of the node values from reference node values and corresponding difference values in the at least one compressed frame,
wherein the node values are lossless copies of corresponding node values compressed by a transmitter of the plurality of frames, and
wherein the compressed frame has a predefined size and the difference values are encoded in a number of bits determined by a maximum difference value in the at least one compressed frame, and
wherein in a first mode of operation, each of the difference values in the at least one compressed frame represents a difference between one of the node values and a corresponding node value in a previously received frame.

23. The apparatus of claim 22, wherein each of the difference values in the at least one compressed frame represents a difference between one of the node values and one or more other values in the at least one compressed frame.

24. The apparatus of claim 22, wherein the means for decompressing the at least one compressed frame is configured to:
generate a predicted value for a first node using a predetermined prediction algorithm; and
adjust the predicted value by a first difference value provided in the at least one compressed frame, wherein the first difference value corresponds to the first node,
wherein difference values in the at least one compressed frame are calculated by the transmitter of the plurality of frames using a prediction algorithm the predetermined prediction algorithm.

25. The apparatus of claim 22, wherein the plurality of frames comprises one or more uncompressed frames, and further comprising:
 means for determining whether each frame in the plurality of frames is compressed based on a header of the each frame.

26. The apparatus of claim 22, wherein each node value corresponds to a state of a sensor on the touchscreen panel.

27. The apparatus of claim 22, further comprising:
 means for unpacking a plurality of data elements received in each frame in the plurality of frames in a second mode of operation, wherein the means for unpacking the plurality of data elements is configured to obtain sets of data elements corresponding to rows or columns of the touchscreen panel.

* * * * *